United States Patent
Akutagawa et al.

(10) Patent No.: US 7,862,896 B2
(45) Date of Patent: Jan. 4, 2011

(54) CORE-SHELL RESIN PARTICLE HAVING LOW CONTENT OF VOLATILE COMPONENTS, AND RESIN DISPERSION

(75) Inventors: Takashi Akutagawa, Hirakata (JP); Tsuyoshi Izumi, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 1117 days.

(21) Appl. No.: 11/496,074

(22) Filed: Jul. 27, 2006

(65) Prior Publication Data

US 2007/0015852 A1    Jan. 18, 2007

Related U.S. Application Data

(63) Continuation-in-part of application No. PCT/JP2005/001371, filed on Jan. 31, 2005.

(30) Foreign Application Priority Data

| Jan. 30, 2004 | (JP) | ............................. 2004-024582 |
| Aug. 31, 2004 | (JP) | ............................. 2004-253512 |
| Oct. 8, 2004 | (JP) | ............................. 2004-296862 |

(51) Int. Cl.
*B32B 5/16* (2006.01)
*B05D 7/00* (2006.01)

(52) U.S. Cl. ..................... 428/407; 427/212; 427/213.3; 427/222

(58) Field of Classification Search ................. 428/403, 428/407; 427/212, 213.3, 222
See application file for complete search history.

(56) References Cited

U.S. PATENT DOCUMENTS

| 5,079,125 A | 1/1992 | Anno et al. |
| 5,225,308 A | 7/1993 | Sasaki et al. |
| 6,894,090 B2 | 5/2005 | Shinzo et al. |

(Continued)

FOREIGN PATENT DOCUMENTS

EP    1 454 943    9/2004

(Continued)

OTHER PUBLICATIONS

Machine-translation JP 2002-284,881, 2002.*

(Continued)

*Primary Examiner*—H. (Holly) T Le
(74) *Attorney, Agent, or Firm*—Edward Angell Palmer & Dodge LLP

(57) ABSTRACT

The present invention relates to core-shell resin particles (C2) each comprising one or more film-like shell layers (P) comprising a first resin (a) and a core layer (Q) comprising a second resin (b). The core-shell resin particle (C2) is characterized in that the weight ratio between (P) and (Q) is from 0.1:99.9 to 70:30, the volatile content in the resin particle (C2) is not more than 2 weight %, and the resin (a) has an initial softening temperature of 40 to 270° C., a Tg of 20 to 250° C., a flow temperature of 60 to 300° C., and the difference of the Tg and the flow temperature in a range of 0 to 120° C. The resin particles are excellent in electrostatic property, thermal storage stability and thermal properties, and exhibit a narrow particle diameter distribution.

6 Claims, 1 Drawing Sheet

U.S. PATENT DOCUMENTS

| | | |
|---|---|---|
| 7,005,480 B2 | 2/2006 | Kinsho et al. |
| 2005/0031871 A1 | 2/2005 | Kinsho et al. |
| 2007/0015851 A1 | 1/2007 | Akutagawa et al. |
| 2010/0221655 A1* | 9/2010 | Mukai et al. ............. 430/110.2 |

FOREIGN PATENT DOCUMENTS

| | | |
|---|---|---|
| JP | 2-287554 | 11/1990 |
| JP | 08-231731 | 10/1996 |
| JP | 10-251414 | 9/1998 |
| JP | 2001-175020 | 6/2001 |
| JP | 2002-006539 | 1/2002 |
| JP | 2002-284881 | 3/2002 |
| JP | 2003-231757 | 8/2003 |
| JP | 2003-327707 | 11/2003 |
| JP | 2004-004405 | 1/2004 |
| WO | WO 03/037964 | 5/2003 |

OTHER PUBLICATIONS

Japanese Patent Office Action in corresponding application JP2005-024613, mailed Aug. 21, 2007 (with English Summary).

Japanese Patent Office Action in corresponding application JP2005-024613, mailed Nov. 20, 2007 (with English Summary).

Japanese Patent Office Action in corresponding application JP2005-024598, mailed May 27, 2008 (with English Summary).

Japanese Patent Office Action in corresponding application JP2005-024613, mailed Feb. 26, 2008 (with English Summary).

Japanese Office Action dated Oct. 20, 2009, in corresponding Japanese Patent Application No. 2005-024598.

* cited by examiner

[FIG. 1]
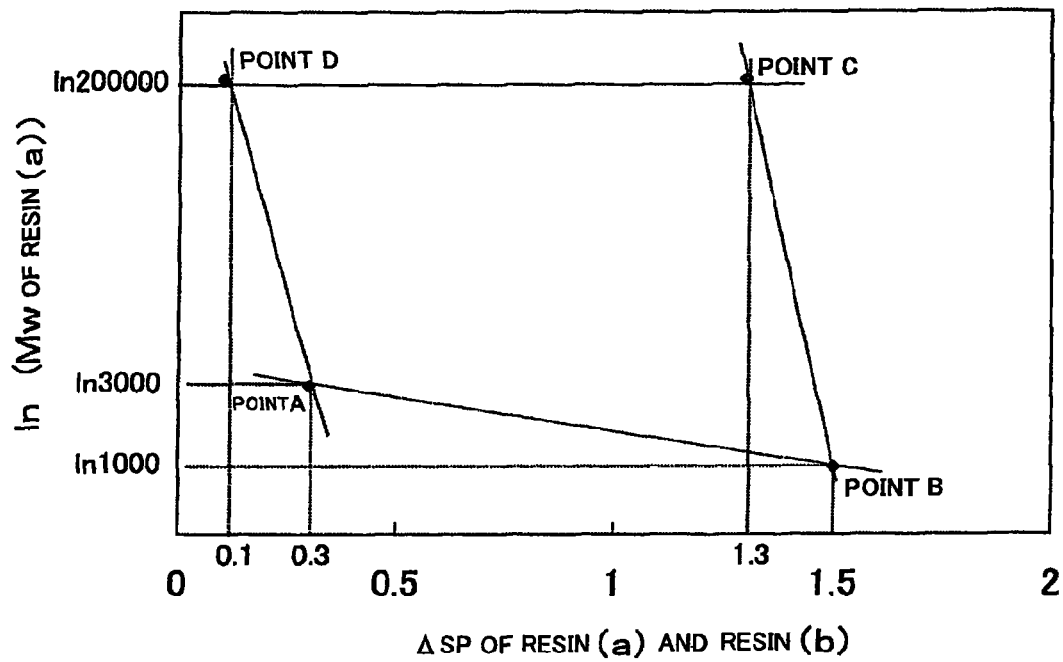
[FIG. 2]
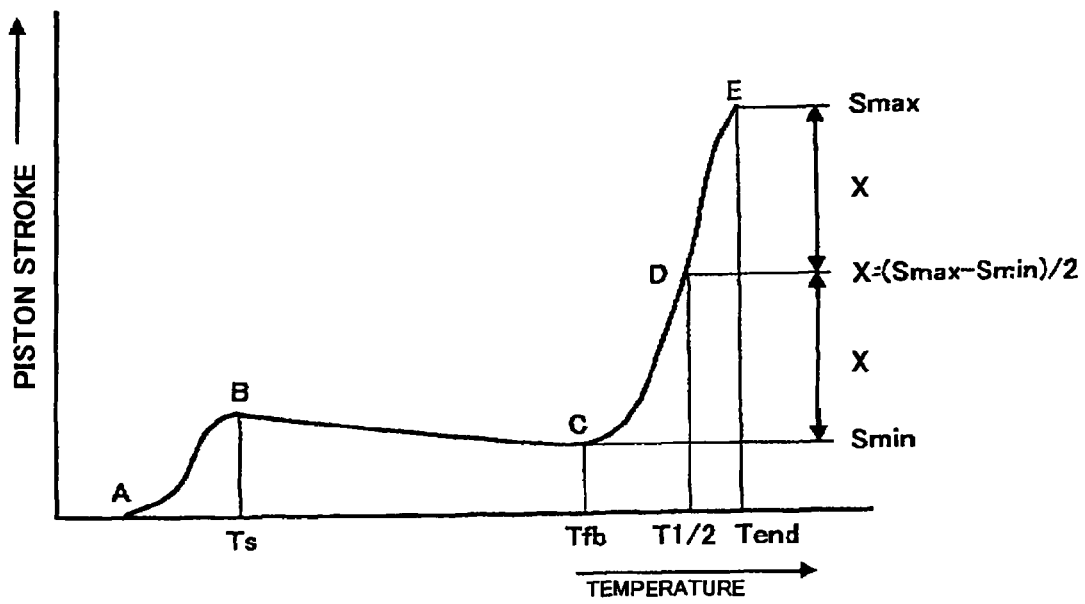

US 7,862,896 B2

CORE-SHELL RESIN PARTICLE HAVING LOW CONTENT OF VOLATILE COMPONENTS, AND RESIN DISPERSION

CROSS-REFERENCE TO RELATED APPLICATIONS

This application is a continuation-in-part of international application number PCT/JP/2005/001371, which has an international filing date of 31 Jan. 2005 and a claimed priority date of 30 Jan. 30, 2004, which is incorporated herein by reference. The claimed priority date is based on Japanese Patent Application Numbers 2004-024582 (filed 30 Jan. 2004), 2004-253512 (filed 31 Aug. 2004), and 2004-296862 (filed 8 Oct. 2004), which are incorporated herein by reference.

TECHNICAL FIELD

The invention relates to a resin dispersion and resin particles. More specifically, the invention relates to resin particles and their water-based dispersion useful for various uses such as a powder coating, an electrophotographic toner, an electrostatic recording toner, and the like.

PRIOR ART

As resin particles having even particle diameters and excellent in electric properties, thermal properties, and chemical stability have been known resin particles using polymer fine particles as a dispersion stabilizer (reference to Patent Document 1)

Patent Document 1: Japanese Patent Application Laid-Open (JP-A) No. 2002-284881

DISCLOSURE OF THE INVENTION

Problem to be Solved by the Invention

However, in the method of using the polymer fine particles, the fine particles sometimes remain and adhere to the resin surface to become interfering substances for fixation or electrostatic charging. Therefore, for powder coatings and toners to be used for electrophotography, electrostatic recording, and electrostatic printing, using the polymer fine particles have not necessarily sufficiently exhibited the advantageous properties (e.g. electrostatic property, thermal resistant storage stability, low temperature fixing property) of main resins.

In view of the above-mentioned state of the art, the invention has been accomplished. That is, the aim of the invention is to provide resin particles excellent in electrostatic property, thermal resistant storage stability, and thermal properties, and having even particle diameters.

Means for Solving the Problems

The inventors of the invention have made various investigations to solve the above-mentioned problems and the findings from the investigations have now led to completion of the invention.

That is, the invention includes the following ten inventions.

[1] Core-shell type resin particles (C2) each comprising a film-like shell layer (P) in one or more layer structure comprising a first resin (a) and a core layer (Q) in one layer structure comprising a second resin (b), wherein the weight ratio of (P) and (Q) is in a range of (0.1:99.9) to (70:30), the content of volatile components of (C2) is 2% by weight or lower, and (a) has an initial softening temperature of 40 to 270° C., a glass transition temperature of 20 to 250° C., a flow temperature of 60 to 300° C., and the difference of the glass transition temperature and the flow temperature in a range of 0 to 120° C.

[2] A water-based dispersion (X1) of resin particles (C1) comprising resin particles (B) bearing resin particles (A) on the surface thereof and obtained by dispersing a second resin (b) or its solvent solution, alternatively a precursor (b0) of the resin (b) or its solvent solution, further causing a reaction of (b0) in the case of using (b0) or its solvent solution, in a water-based dispersion (W) of resin particles (A) comprising a first resin (a); and thereby forming the resin particles (B) comprising (b) in (W), wherein a point (K,H) is within an area surrounded by a quadrangle defined by the following four points A, B, C, and D including the side lines in a system of K, H coordinates wherein K denotes sp value difference (Δsp) of (a) and (b) and H denotes the natural logarithm [ln(Mw)] of the weight average molecular weight of (a):

A (0.3, ln 3000), B (1.5, ln 1000), C (1.3, ln 200000), and D (0.1, ln 200000).

[3] A water-based dispersion (X1) of resin particles (C1) comprising resin particles (B) bearing resin particles (A) on the surface and obtained by dispersing a second resin (b) or its solvent solution, alternatively a precursor (b0) of the resin (b) or its solvent solution, further causing a reaction of (b0) in the case of using (b0) or its solvent solution, in a water-based dispersion (W) of resin particles (A) comprising a first resin (a); and thereby forming the resin particles (B) comprising (b) in (W), wherein (a) is a resin having an initial softening temperature of 40 to 270° C., a glass transition temperature of 20 to 250° C., a flow temperature of 60 to 300° C., and the difference of the glass transition temperature and flow temperature in a range from 0 to 120° C.

[4] A water-based dispersion (X1) of resin particles (C1) comprising resin particles (B) bearing resin particles (A) on the surface thereof and obtained by dispersing a second resin (b) or its solvent solution, alternatively a precursor (b0) of the resin (b) or its solvent solution, further causing a reaction of (b0) in the case of using (b0) or its solvent solution, in a water-based dispersion of resin particles (A) comprising a first resin (a); and thereby forming the resin particles (B) comprising (b) in the water-based dispersion of (A), wherein (a) contains a constituent unit of the following organic acid metal salt (m), and/or (A) contains the following organic acid metal salt (m):

organic acid metal salt (m): one or more kinds of salts selected from carboxylic acid salts, sulfonic acid salts, and phosphoric acid salts of a metal selected from Al, Ti, Cr, Mn, Fe, Zn, Ba, and Zr.

[5] Resin particles obtained by removing the water-based solvent from the water based resin dispersion (X1) of one of [2], [3], and [4].

[6] A water-based resin dispersion (X2) of resin particles (C21) obtained by forming a shell layer (P) in the form of a film made of (A) on the surface of a core layer (Q) containing (B) by dissolving (A) adhering to (B) in the solvent and/or melting (A) adhering to (B) in the water-based resin dispersion (X1) of one of [2], [3], and [4].

[7] Resin particles obtained by removing the water-based solvent from the water based resin dispersion (X2) of [6].

[8] A water-based dispersion (X2) of resin particles (C21) obtained by forming a shell layer (P) in the form of a film made of resin particle(s) (A) on the surface of a core layer (Q) composed of a resin particle (B) by obtaining a water-based dispersion (X1) of resin particles (C1) comprising (B) bearing (A) on the surface thereof by dispersing a second resin (b) or its solvent solution, alternatively a precursor (b0) of the resin (b) or its solvent solution, further causing a reaction of (b0) in the case of using (b0) or its solvent solution, in a water-based dispersion of (A) comprising a first resin (a); and thereby forming (B) comprising (b) in the water-based dispersion of (A) and then dissolving (A) adhering to (B) in the solvent and/or melting (A) adhering to (B) in the water-based dispersion (X1).

[9] Resin particles obtained by removing the water-based solvent from the water based resin dispersion (X2) of [8].

[10] A production method of resin particles by obtaining a water-based dispersion (X1) of resin particles (C1) comprising resin particles (B) bearing resin particles (A) on the surface thereof by dispersing a second resin (b) or its solvent solution, alternatively a precursor (b0) of the resin (b) or its solvent solution, further causing a reaction of (b0) in the case of using (b0) or its solvent solution, in a water-based dispersion of (A) comprising a first resin (a) and thereby forming the resin particles (B) comprising (b) in the water-based dispersion of (A); obtaining water-based dispersion (X2) of resin particles (C21) obtained by forming a shell layer (P) in the form of a film made of resin particle(s) (A) on the surface of a core layer (Q) composed of a resin particle (B) by successively dissolving (A) adhering to (B) in the solvent and/or melting (A) adhering to (B) in the water-based dispersion (X1); and finally removing the water-based solvent from the water based dispersion (X2)

EFFECTS OF THE INVENTION

A resin dispersion of the invention and resin particles obtained from the dispersion have the following effects.

1. Excellent in thermal property and electrostatic property, and having even particle diameters.

2. Excellent in thermal resistant storage stability and powder flowability.

3. Excellent in smoothness of particle surfaces (particularly in the case of having a shell layer in the form of a film).

4. Since resin particles can be obtained by dispersion in water, production is carried out at a low cost.

5. Good mechanical physical properties of heated and melted coating.

BRIEF DESCRIPTION OF THE DRAWINGS

FIG. 1 is a graph showing a correlation of the sp value difference (K) of (a) and (b) and the natural logarithm ln(Mw) (H) of the weight average molecular weight (Mw) of (a).

FIG. 2 is a schematic view showing a flow chart of flow tester measurement of resin particles.

BEST MODES FOR CARRYING OUT THE INVENTIONS

With respect to core-shell type resin particles (C2) each comprising a film-like shell layer (P) in one or more layer structure comprising a first resin (a) and a core layer (Q) in one layer structure comprising a second resin (b) of the first invention, the weight ratio of (P) and (Q) is preferably in a range of (0.1:99.9) to (70:30), more preferably in a range of (1:99) to (50:50), and even more preferably in a range of (1.5:98.5) to (30:70) in terms of particle diameter evenness, storage stability, and fixing property of the resin particles (C2). If the weight of the shell part is too low, the blocking resistance may possibly be decreased. Meanwhile, if the weight of the shell part is too high, the fixing property, particularly low temperature fixing property, may possibly be decreased.

(P) may be formed in two or more (e.g. 2 to 5 layers) layers, however it is preferably in a single layer.

Further, content of volatile components of (C2) is generally 2% or lower and more preferably 1% or lower. If the content of the volatile components exceeds 2%, the thermal resistant storage stability may possibly be decreased. In the inventions, the content of volatile components means the decrease of the weight after heating a sample at 150° C. for 45 minutes. "%" in the description above and hereinafter means % by weight unless otherwise specified.

In the first, eighth, and tenth inventions, any resin may be used as the resin (a) if it is suitable to form the shell layer (P). In the second invention, any resin can be used as (a) if it satisfied the above-mentioned condition of the correlation between the sp value difference K from that of the resin (b) to be used and the natural logarithms value H [ln(Mw)] of the weight average molecular weight of (a) and is usable for forming the water-based dispersion (W). In the third invention, any resin can be used as (a) if it has the above-mentioned initial softening temperature, glass transition temperature, flow temperature, and difference between the glass transition temperature and the flow temperature and is usable for forming the water-based dispersion (W). In the fourth invention, any resin can be used as (a) if it is usable for forming the water-based dispersion.

In the fourth invention, in terms of the electrostatic property, it is indispensable that the above-mentioned organic acid metal salt (m) is contained as the constituent unit of the resin (a) and/or the above-mentioned organic acid metal salt (m) is contained in the resin particles (A). If (m) is contained, resin particles excellent particularly in electrostatic property are obtained and therefore it is preferable. Carboxylic acids are preferable as the organic salt composing (m). Zn and Fe are preferable among metals and Zn is more preferable.

Among them, it is preferable that (A) contains (m) in terms of the easiness of the preparation.

Resins other than a polyurethane resin are contained as the resin (a) and which may be thermoplastic resins and thermosetting resins.

Examples usable as resin (a) are vinyl resins, epoxy resins, polyester resins, polyamide resins, polyimide resins, silicon resins, phenol resins, melamine resins, urea resins, aniline resins, ionomer resins, and polycarbonate resins. The resin (a) may include two or more of the above-mentioned resins. Preferable resins among them are polyester resins, epoxy resins, vinyl resins, and their combinations in terms of the easiness of shell layer formation.

Generally in the inventions, particularly in the second invention, to obtain the water-based dispersion (W) of fine and spherical resin particles (A) and to obtain the water-based dispersion (X1) of resin particles (C1) excellent in the thermal resistant storage stability, and electrostatic property and having even particle diameter, the resin (a) is preferable to have sulfonic acid anion ($-SO_3^-$). The total content of sulfonic acid anion ($-SO_3^-$) is preferably 0.001 to 10% of the weight of (a). The lower limit is more preferably 0.002% and the upper limit is more preferably 5%, further preferably 2%, and even more preferably 1%. The number of carbon atoms of a monomer having sulfonic acid anion ($-SO_3^-$) and composing the resin is preferably in a range from 3 to 50, more preferably in a range from 3 to 30, and even preferably in a range from 4 to 15.

If the content of sulfonic acid anion ($-SO_3^-$) is the above-mentioned lower limit or higher and the number of carbon atoms of the monomer containing sulfonic acid anion ($-SO_3^-$) and composing the resin is the above-mentioned upper limit or lower, the resin (a) is easy to be dispersed in a water-based solvent and the water-based dispersion (W) of the fine and spherical resin particles (A) can easily be obtained. Also, the blocking resistance and electrostatic property of the obtained resin particles (C1) or (C2) [(C2) includes (C21). Hereinafter, "(C1) or (C2)" may be sometime referred to as (C)] are improved.

Further, generally in the inventions, particularly in the third invention, to obtain the water-based dispersion (W) of fine and spherical resin particles (A), it is preferable for the resin (a) to contain carboxyl groups. At least some of the carboxyl groups may be neutralized with a base. The neutralization ratio of the carboxyl groups with a base is preferably 20 to 100% by equivalent and more preferably 40 to 100% by equivalent.

The content of carboxyl groups [in the case of neutralization with a base, the content based on the conversion into carboxyl ($-COOH$) groups] is preferably 0.1 to 10% of the weight of (a). The lower limit is more preferably 0.5%, furthermore preferably 1%, and even more preferably 3% and the upper limit is more preferably 9.5%, furthermore preferably 9%, and even more preferably 8%.

If the neutralization with a base and the content of the carboxyl groups are the above-mentioned lower limit or higher, the resin (a) is easy to be dispersed in a water-based solvent and the water-based dispersion (W) of the fine and spherical resin particles (A) can easily be obtained. Also, the electrostatic property of the obtained resin particles (C) is improved.

The above-mentioned base for forming the neutral salt may be ammonia, monoamines having 1 to 30 carbon atoms, polyamines (21) described later, quaternary ammoniums, alkali metals (e.g., sodium and potassium), and alkaline earth metals (e.g. calcium salts and magnesium salts).

The monoamines having 1 to 30 carbon atoms may include primary and/or secondary amines having 1 to 30 carbon atoms (e.g., ethylamine, n-butylamine, and isobutylamine), tertiary amines having 3 to 30 carbon atoms (e.g., trimethylamine, triethylamine, lauryldimethylamine). The quaternary ammoniums may include trialkylammonium having 4 to 30 carbon atoms (e.g., lauryltrimethylammonium).

Among them alkali metals, quaternary ammoniums, monoamines, and polyamines are preferable; sodium and monoamine having 1 to 20 carbon atoms are more preferable; and tertiary monoamines having 3 to 20 carbon atoms are even more preferable.

The carbon atom number of monomers containing carboxyl or its salt composing the vinyl resins and polyester resins is preferably 3 to 30, more preferably 3 to 15, and even more preferably 3 to 8.

Hereinafter, vinyl resins, polyester resins, and epoxy resins preferable to be used will be described more in detail.

Vinyl resins are polymers obtained by homopolymerization or copolymerization of vinyl monomers. The vinyl monomers may include the following (1) to (10).

(1) Vinyl hydrocarbons:

(1-1) aliphatic vinyl hydrocarbons: alkenes such as ethylene, propylene, butane, isobutylene, pentene, heptene, diisobutylene, octane, dodecene, octadecene, and α-olefins other than the above-mentioned alkenes; and alkadienes such as butadiene, isoprene, 1,4-pentadiene, 1,6-hexadiene, and 1,7-octadiene:

(1-2) alicyclic vinyl hydrocarbons: mono- or di-cycloalkene and alkadienes, e.g., cyclohexene, (di)cyclopentadiene, vinylcyclohexene, and ethylidenebicycloheptene; and terpenes e.g., pinene, limonene, and indene: and (1-3) aromatic vinyl hydrocarbons: styrene and its hydrocarbyl (e.g., alkyl, cycloalkyl, aralkyl and/or alkenyl)-substituted compounds, e.g., α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene, and vinylnaphthalene.

(2) Carboxyl group-containing vinyl monomers and their metal salts: unsaturated monocarboxylic acids having 3 to 30 carbon atoms, unsaturated dicarboxylic acids having 3 to 30 carbon atoms, their anhydrides, and their monoalkyl (1 to 24 carbon atoms) esters, e.g., (meth)acrylic acid, maleic acid (anhydride), maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester, and cinnamic acid.

(3) Sulfone group-containing vinyl monomers, vinylsulfuric acid monoester compounds and their salts: e.g., alkenesulfonic acid having 2 to 14 carbon atoms such as vinylsulfonic acid, (meth)allylsulfonic acid, methylvinylsulfonic acid, and styrenesulfonic acid; their alkyl (having 2 to 24 carbon atoms) derivatives such as α-methylstyrenesulfonic acid; sulfo(hydroxy)alkyl(meth)acrylates or (meth)acrylamides such as sulfopropyl(meth)acrylate, 2-hydroxy-3-(meth)acryloxypropylsulfonic acid, 2-(meth)acryloylamino-2,2-dimethylethanesulfonic acid, 2-(meth)acryloyloxyethanesulfonic acid, 3-(meth)acryloyloxy-2-hydroxypropanesulfonic acid, 2-(meth)acrylamido-2-methylpropanesulfonic acid, 3-(meth)acrylamido-2-hydroxypropanesulfonic acid, alkyl (having 3 to 18 carbon atoms)-allylsulfosuccinic acid, poly(n=2 to 30)oxyalkylene (ethylene, propylene, and butylene: mono, random, or block) mono(meth)acrylate sulfuric acid esters [poly(n=5 to 15)oxypropylene monomethacrylate sulfuric acid esters], polyoxyethylene polycyclic phenyl ether sulfuric acid ester, and sulfuric acid esters or sulfonic acid group-containing monomers defined by the following formulas (1-1) to (1-3); and their salts:

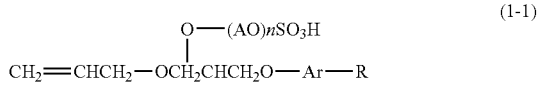

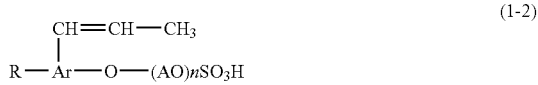

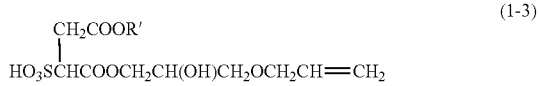

wherein R denotes an alkyl having 1 to 15 carbon atoms; A denotes an alkylene having 2 to 4 carbon atoms and may be same or different in the case n is plural and in the case of different alkylenes, they may be random or block form; Ar denotes a benzene ring; n denotes an integer of 1 to 50; R' denotes a fluorine-substituted or unsubstituted alkylene having 1 to 15 carbon atoms.

(4) Phosphoric acid group-containing vinyl monomers and their salts: (meth)acryloyloxyalkyl (C1 to C24) phosphoric acid monoesters such as 2-hydroxyethyl(meth)acryloylphosphate, phenyl-2-acryloyloxyethylphosphate, (meth)acryloyoxyalkyl (C1 to C24)-sulfonic acid such as 2-acryloyloxyethylphosphonic acid.

As the salts of the above-exemplified compounds (2) and (4) may be included metal salts, ammonium salts, and amine salts (including quaternary ammonium salts). The metals to form the metal salts are Al, Ti, Cr, Mn, Fe, Zn, Ba, Zr, Ca, Mg, Na, and K. Alkali metal salts and amine salts are preferable and sodium salts and salts of tertiary monoamine having 3 to 20 carbon atoms are more preferable.

(5) Hydroxyl-containing vinyl monomers: hydroxystyrene, N-methylol(meth)acrylamide, hydroxyethyl(meth)acrylate, hydroxypropyl(meth)acrylate, polyethylene glycol mono (meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethyl propenyl ether, and sucrose allyl ether.

(6) Nitrogen-containing vinyl monomers:

(6-1) amino group-containing vinyl monomers: aminoethyl (meth)acrylate, dimethylaminoethyl(meth)acrylate, diethylaminoethyl(meth)acrylate, tert-butylaminoethyl methacrylate, N-aminoethyl(meth)acrylamide, (meth)allylamine, morpholinoethyl(meth)acrylate, 4-vinylpyridine, 2-vinylpyridine, crotylamine, N,N-dimethylaminostyrene, methyl α-acetoaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, aminomethylcaptothiazole, and their salts;

(6-2) amido group-containing vinyl monomers: (meth)acrylamide, N-methyl(meth)acrylamide, N-butylacrylamide, diacetoneacrylamide, N-methylol(meth)acrylamide, N,N'-methylene-bis(meth)acrylamide, sinnamic acid amide, N,N-dimethylacrylamide, N,N-dibenzylacrylamide, methacrylformamide, N-methyl-N-vinylacetamide, and N-vinylpyrrolidone;

(6-3) nitryl group-containing vinyl monomers: (meth)acrylonitrile, cyanostyrene, and cyanoacrylate;

(6-4) quaternary ammonium cation group-containing vinyl monomers: quaternary compounds (quaternalized by using quaternarization agents such as methyl chloride, dimethyl sulfric acid, benzyl chloride, dimethyl carbonate) of tertiary amine group-containing vinyl monomers such as dimethylaminoethyl(meth)acrylate, diethylaminoethyl (meth)acrylate, dimethylaminoethyl(meth)acrylamide, and diethylaminoethyl(meth)acrylamide, diallyl amine; and (6-5) nitro group-containing vinyl monomer: nitrostyrene.

(7) Epoxyl-containing vinyl monomers: glycidyl(meth)acrylate, tetrahydrofurfuryl(meth)acrylate, p-vinylphenylphenyl oxide, (8) halogen-containing vinyl monomers: vinyl chloride, vinyl bromide, vinylidiene chloride, acryl chloride, chlorostyrene, bromostyrene, dichlorostyrene, chloromethylstyrene, tetrafluorosthylene and chloroprene.

(9) Vinyl esters, vinyl(thio)ethers, vinyl ketones, and vinyl sulfones:

(9-1) vinyl esters: e.g., vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinylmethoxy acetate, vinyl benzoate, ethyl α-ethoxyacrylate, alkyl(meth)acrylate having alkyl with 1 to 50 carbon atoms [e.g., methyl(meth)acrylate, ethyl (meth)acrylate, propyl(meth)acrylate, butyl(meth)acrylate, 2-ethylhexyl(meth)acrylate, dodecyl(meth)acrylate, hexadecyl (meth)acrylate, heptadecyl(meth)acrylate, and eicosyl (meth)acrylate], dialkyl fumarate (the two alkyl groups may be linear, branched, or alicyclic alkyls having 2 to 8 carbon atoms), dialkyl maleate (the two alkyl groups may be linear, branched, or alicyclic alkyls having 2 to 8 carbon atoms), poly(meth)acryloxyalkanes [e.g. diaryloxyethane, triaryloxyethane, tetraaryloxyethane, tetraaryloxypropane, tetraaryloxybutane, and tetramethyloxyethane], polyalkylene glycol chain-containing vinyl monomers [e.g., polyethylene glycol (molecular weight 300) mono(meth)acrylate, polypropylene glycol (molecular weight 500) monoacrylate, methyl alcohol ethylene oxide (hereinafter, ethylene oxide is abbreviated as EO) 10 mole adduct (meth)acrylate, and lauryl alcohol EO 30 mole adduct (meth)acrylate], poly(meth)acrylates [e.g. polyhydric alcohol poly(meth)acrylates such as ethylene glycol di(meth)acrylate, propylene glycol di(meth)acrylate, neopentyl glycol di(meth)acrylate, trimethylolpropane tri(meth)acrylate, and polyethylene glycol di(meth)acrylate];

(9-2) vinyl(thio) ethers such as vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1,2-pyrane, 2-butoxy-2'-vinyloxy diethyl ether, vinyl 2-ethylmercaptoethyl ether, acetoxystyrene, and phenoxystyrene;

(9-3) vinyl ketones such as vinyl methyl ketone, vinyl ethyl ketone, and vinyl phenyl ketone; and vinyl sulfones such as divinyl sulfide, p-vinyl diphenyl sulfide, vinyl ethyl sulfide, vinyl ethyl sulfone, divinyl sulfone, and divinyl sulfoxide.

(10) Other vinyl monomers: isocyanatoethyl(meth)acrylate, m-isopropenyl-α,α-dimethylbenzyl isocyanate.

In the fourth invention, in the case a vinyl resin containing a constituent unit of an organic acid metal salt (m) as (a), the resin is obtained by using one or more kinds of metal salts selected from Al, Ti, Cr, Mn, Fe, Zn, Ba, and Zr of the above-mentioned monomers (2) to (4) as at least some of the monomers. The use amount of these organic acid metal salt monomers (m) in the entire monomers to be used is preferably 5 to 60%. The lower limit is more preferably 10% and the upper limit is more preferably 50%.

The copolymers of the vinyl monomers may include polymers obtained by copolymerizing properly selected two or more kinds of monomers of the above-exemplified (1) to (10) at optional ratios preferably so as to adjust the content of the carboxyl groups in the resin particles (A) to be 0.1 to 10% and examples are styrene-(meth)acrylic acid ester-(meth)acrylic acid copolymer, styrene-butadiene-(meth)acrylic acid copolymer, (meth)acrylic acid-acrylic acid ester copolymer, styrene-acrylonitrile-(meth)acrylic acid copolymer, styrene-(meth)acrylic acid copolymer, styrene-(meth)acrylic acid-divinylbenzene copolymer, styrene-styrenesulfonic acid-(meth)acrylic acid ester copolymer, and salts of these copolymers.

In the case the resin (a) forms the resin particles (A) in the water-based dispersion (X1), it is required for the resin (a) not to be dissolved completely at least in the condition in which (X1) is produced. Therefore, in the case the vinyl resin is a copolymer, the ratio of the hydrophobic monomer and the hydrophilic monomer composing the vinyl resin is generally preferably 10% or higher and more preferably 30% or higher for the hydrophobic monomer although it depends on the types of the selected monomers. If the ratio of the hydrophobic monomer is lowered to 10% or less, the vinyl resin becomes water-soluble and the evenness of the particle diameter of (C) is deteriorated. Herein, a hydrophilic monomer means a monomer dissolved at an optional ratio in water and a hydrophobic monomer include monomers other than that (monomers basically having no affinity to water).

Polyester resins may include condensation polymers of polyols with polycarboxylic acid, their anhydrides, or their lower alkyl esters, and metal salts of these condensation polymers. Polyols may include diol (11) and tri- to octa- or higher hydric polyol (12) and polycarboxylic acids, their anhydrides, or their lower alkyl esters may include dicarboxylic acid (13) and tri- to hexa- or higher valent polycarboxylic acid (14), their anhydrides, or their lower alkyl esters.

The ratio of the polyol and the polycarboxylic acid on the basis of the equivalent ratio [OH]/[COOH] of the hydroxyl [OH] and carboxyl [COOH] is preferably in a range from 2/1 to 1/5, more preferably in a range from 1.5/1 to 1/4, and even more preferably in a range from 1/1.3 to 1/3.

To adjust the content of the carboxyl group within the above-mentioned preferable range, a polyester having an excess amount of hydroxy group may be treated with a polycarboxylic acid.

The diols (11) may include alkylene glycols (e.g., ethylene glycol, 1,2-propoylene glycol, 1,3-propylene glycol, 1,4-butanediol, 1,6-hexandiol, octanediol, decanediol, dodecanediol, tetradecanediol, neopentyl glycol, and 2,2-diethyl-1,3-propanediol); alkylene ether glycols having 4 to 36 carbon atoms (e.g., diethylene glycol, triethylene glycol, dipropylene glycol, polyethylene glycol, polypropylene glycol, and polytetramethylene ether glycol); alicyclic diols having 4 to 36 carbon atoms (e.g., 1,4-dicyclohexanedimethanol and hydrogenated bisphenol A); alkylene oxide (hereinafter, abbreviated as AO) [e.g., EO and propylene oxide (hereinafter, abbreviated as PO), butylene oxide (hereinafter, abbreviated as BO)] adducts (addition mole number: 1 to 120) of the above-mentioned alkylene glycols or alicyclic diols; AO (EO, PO, and BO) adducts (addition mole number: 2 to 30) of bisphenols (e.g. bisphenol A, bisphenol F, and bisphenol S); polylactone diols (e.g. poly(ε-caprolactone diol)); and polybutadiene diol.

The diols may include diols (11a) having another functional group other than the above-mentioned diols having no functional group except hydroxyl. Examples of (11a) are diols having carboxyl, diols having sulfonic acid group or sulfamic acid group, and their salts.

Diols having carboxyl may include dialkylol alkanoic acids [of C6-24, e.g., 2,2-dimethylolpropionic acid (DMPA), 2,2-dimethylolbutanoic acid, 2,2-dimethylolheptanoic acid, and 2,2-dimethyloloctanoic acid].

Diols having sulfonic acid group or sulfamic acid group may include sulfamic acid dials [e.g., N,N-bis(2-hydroxyalkyl)sulfamic acid (C1-6 alkyl) or its AO adducts (AO may be EO or PO: addition mole number of AO is 1 to 6) such as N,N-bis(2-hydroxyethyl)sulfamic acid and N,N-bis(2-hydroxyethyl)sulfamic acid PO 2 mole adduct]; and bis(2-hydroxyethyl)phosphate.

Neutralizing base groups of these diols having the neutralizing base groups may include, for example, the above-mentioned tertiary amines having 3 to 30 carbon atoms (e.g., triethylamine) and/or alkali metals (e.g., sodium salt).

Among them are alkylene glycol having 2 to 12 carbon atoms, diols having carboxyl, AO adducts of bisphenols, and their combinations preferable.

Polyols (12) may include tri- to octa- or higher polyhydric aliphatic alcohols having 3 to 36 carbon atoms (e.g., alkane polyols and their internal or intermolecular dehydrates such as glycerin, trimethylolethane, trimethylolpropane, pentaerythritol, sorbitol, sorbitan, and polyglycerin; saccharides and their derivatives such as sucrose and methyl glycoside); polyhydric aliphatic alcohol AO adducts (addition mole number: 2 to 120); trisphenols (e.g., trisphenol PA) AO adducts (addition mole number: 2 to 30); novolak resins (e.g., phenol novolak, cresol novolak) AO adducts (addition mole number: 2 to 30); and acrylic polyols [e.g., copolymers of hydroxyethyl (meth)acrylate and other vinyl monomers].

Among them are tri- to octa- or higher polyhydric aliphatic alcohols and novolak resin AO adducts preferable and especially novolak resin AO adducts more preferable.

Dicarboxylic acids (13) may include alkanedicarboxylic acids having 4 to 36 carbon atoms (e.g., succinic acid, adipic acid, sebacic acid, azelaic acid, dodecanedicarboxylic acid, octadecanedicarboxylic acid, and decylsuccinic acid) and alkenylsuccinic acids (e.g., dodecenylsuccinic acid, pentadecenylsuccinic acid, and octadecenylsuccinic acid); alicyclic dicarboxylic acids having 6 to 40 carbon atoms [e.g., dimmer acid (dimerization linoleic acid)]; alkenedicarboxylic acids having 4 to 36 carbon atoms (e.g., maleic acid, fumaric acid, and citraconic acid); aromatic dicarboxylic acids having 8 to 36 carbon atoms (e.g., phthalic acid, isophthalic acid, terephthalic acid, and naphthalenedicarboxylic acid). Preferable examples among them are alkanedicarboxylic acids having 4 to 20 carbon atoms and aromatic dicarboxylic acids having 8 to 20 carbon atoms.

Tri- to hexa- or higher valent polycarboxylic acids (14) may include aromatic polycarboxylic acids having 9 to 20 carbon atoms (trimellitic acid and pyromellitic acid).

As dicarboxylic acids (13) or tri- to hexa- or higher valent polycarboxylic acids (14), acid anhydrides of the above-mentioned examples or their esters of lower alkyl having 1 to 4 carbon atoms (e.g., methyl ester, ethyl ester, and isopropyl ester) may be used.

In the fourth invention, in the case a polyester resin containing a constituent unit of the organic acid metal salt (m) as (a), the resin is, for example, obtained by synthesizing a polyester (having an acid value preferably in a range of 1 to 100 and more preferably in a range from 5 to 50) having COOH residual groups and making at least some of the COOH groups to be a salt of at least one metal selected from Al, Ti, Cr, Mn, Fe, Zn, Ba, and Zr.

A method for making a metal salt may be carried out by reaction of the polyester having COOH groups with the corresponding metal hydroxide.

The epoxy resins may include ring opening polymers of polyepoxides (18), addition polymers of polyepoxides (18) and active hydrogen-containing compounds (D) {water, polyols [above-mentioned diols (11) and tri- and higher hydric polyols (12)], dicarboxylic acids (13), tri and higher valent polycarboxylic acids (14), polyamines (16) which will be mentioned later, and polythiols (17) which will be mentioned later}, or cured products of polyepoxides (18) with dicarboxylic acids (13) and tri and higher valent polycarboxylic acid (14) anhydrides.

The polyepoxides (18) of the invention are not particularly limited if they have two or more epoxy groups in the molecule. Preferable examples of the polyepoxides (18) are those having 2 to 6 epoxy groups in a molecule in terms of mechanical properties of cured products. The epoxy equivalent (molecular weight per one epoxy group) of the polyepoxides (18) is generally 65 to 1000 and preferably 90 to 500. If the epoxy equivalent exceeds 1000, the cross-linked structure becomes loose and the physical properties such as water resistance, chemical resistance, and mechanical strength of the cured products are worsened and on the other hand, it is difficult to synthesize those having epoxy equivalent less than 65.

Examples of the polyepoxides (18) are aromatic polyepoxy compounds, heterocyclic polyepoxy compounds, alicyclic polyepoxy compounds, or aliphatic polyepoxy compounds. Examples of the aromatic polyepoxy compounds are glycidyl esters and glycidyl ethers of polyhydric phenols, glycidyl aromatic polyamines, and glycidyl compounds of aminophenol. Examples of polyhydric phenol glycidyl ethers are bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl ether, tetrachlorobisphenol A diglycidyl ether, catechin diglycidyl ether, resorcinol diglycidyl ether, hydroquinone diglycidyl ether, pyrogallol triglycidyl ether, 1,5-dihydroxynapthaline diglycidyl ether, dihydroxybiphenyl diglycidyl ether, octachloro-4,4'-dihydroxybiphenyl diglycidyl ether, tetramethylbiphenyl diglycidyl ether, dihydroxynaphthyl cresol triglycidyl ether, tris(hydroxyphenyl)methane triglycidyl ether, dinaphthyltriol triglycidyl ether, tetrakis(4-hydroxyphenyl)ethane tetraglycidyl ether, p-glycidylphenyldimethyltolyl bisphenol A glycidyl ether, trismethyl-tert-butyl-butylhydroxymethane triglycidyl ether, 9,9'-bis(4-hydroxyphenyl)fluorene diglycidyl ether, 4,4'-oxybis(1,4-phenylethyl)tetracresol diglycidyl ether, 4,4'-oxybis(1,4-phenylethyl)phenyl glycidyl ether, bis(dihydroxynaphthalene) tetraglycidyl ether, phenol or cresol novolak resin glycidyl ethers, limonene phenol novolak resin glycidyl ethers, diglycidyl ethers obtained by reaction of 2 mole of bisphenol A and 3 mole epichlorohydrin, polyglycidyl ethers of polyphenols obtained by condensation reaction of phenol with glyoxal, glutaraldehyde, or formaldehyde, and polyglycidyl ethers of polyphenols obtained by condensation reaction of resorcin and acetone. Examples of the polyglycidyl esters of polyphenols are phthalic acid diglycidyl ester, isophthalic acid diglycidyl ester, and terephthalic acid diglycidyl ester. Examples of the glycidyl aromatic polyamines are N,N-diglycidylaniline, N,N,N',N'-tetraglycidylxylylenediamine, and N,N,N',N'-tetraglycidyldiphenylmethanediamine. Further, in the inventions, p-aminophenol triglycidyl ether, diglycidylurethane compounds obtained by addition reaction of tolylene diisocyanate or diphenylmethane diisocyanate with glycidol, and diglycidyl ethers of alkylene oxide (e.g., ethylene oxide or propylene oxide) adducts of glycidyl-containing polyurethane (pre)polymers and bisphenol A obtained by reaction of the former two reaction products with polyols are also included as the aromatic polyepoxy compounds. The heterocyclic polyepoxy compounds may include trisglycidylmelamine. Examples of the aliphatic polyethoxy compounds are vinylcyclohexene dioxide, limonene dioxide, dicyclopentadiene dioxide, bis(2,3-epoxycyclopentyl) ether, ethylene glycol bisepoxydicyclopentyl ether, 3,4-epoxy-6-methylcyclohexylmethyl-3',4'-epoxy-6'-methylcyclohexane carboxylate, bis(3,4-epoxy-6-methylcyclohexylmethyl) adipate, bis(3,4-epoxy-6-methylcyclohexylmethyl) butylamine, and dimer acid diglycidyl esters. Examples of the alicyclic type compounds may include those obtained by nuclear-hydrogenation of the above-mentioned aromatic polyepoxide compounds and examples of aromatic polyepoxy compounds are polyglycidyl ethers of aliphatic polyhydric alcohols, polyglycidyl esters of aliphatic polyfatty acids, and aliphatic glycidyl amines. Examples of the polyglycidyl ethers of the aliphatic polyhydric alcohols are ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, and polyglycerol polyglycidyl ether. Examples of the polyglycidyl ethers of polyfatty acids are diglycidyl oxalate, diglycidyl maleate, diglycidyl succinate, diglycidyl glutarate, diglycidyl adipate, and diglycidyl pimelate. The aliphatic glycidyl amines may include N,N,N',N'-tetraglycidylhexamethylenediamine. Further, in the inventions, the aliphatic type compounds may also include diglycidyl ethers and glycidyl(meth)acrylate (co) polymers. Those preferable among them are aliphatic polyethoxy compounds and aromatic polyepoxy compounds. Two or more kinds of the polyepoxides may be use used in combination in the inventions.

Resins satisfying the conditions of the first (the third invention as well), and the second inventions are preferable for the resin (a) and in the case the electrostatic property is regarded as one of important factors, it is preferable for the resins to satisfy the conditions of the fourth invention as well.

In the fourth invention, other than the method of using the above-mentioned resin (a) into which the organic acid salts (m) of metals selected from Al, Ti, Cr, Mn, Fe, Zn, Ba, and Zr is introduced, (m) may be added to the resin particles (A) to obtain the water-based dispersion of the fourth invention. Further, the method may also be used in which the resin particles (A) obtained by using above-mentioned methods in combination are used.

Practical examples to be used preferably as the carboxylic acid metal salts among the organic acid metal salts (m) may be those exemplified as the metal salts of aromatic fatty acids having 7 to 35 carbon atoms such as (alkyl-substituted) benzoic acids, (alkyl-substituted) salicylic acids, and naphthenic acid, higher fatty acids having 12 to 35 carbon atoms such as stearic acid, and the above-mentioned carboxyl-containing vinyl monomers. Practical examples to be used preferably as the sulfonic acid metal salts are those exemplified as the metal salts of alkylbenzenesulfonic acids having 7 to 30 carbon atoms and sulfone group-containing vinyl monomers composing the vinyl resins. Examples to be used preferably as the phosphoric acid metal salts are those exemplified as the metal salts of the phosphoric acid group-containing vinyl monomers composing the vinyl resins. Among them, oil-soluble metal salts are more preferable in terms of the exhibition of electrostatic property of the resin particles (C). In terms of the composition, carboxylic acid metal salts are more preferable and Zn salts and Fe salts of carboxylic acids are particularly more preferable.

A method of adding the organic acid metal salts (m) to (A) may be carried out by loading it before production of (a) if there is no reactivity with the precursor of the resin (a), however it is preferable to mix them with (a) after the production of (a).

The use ratio of the constituent units of these organic acid metal salts (m) and the organic acid metal salts (m) is not particularly limited, however it is preferable to be 0.01 to 10% in the total of them to the resin particles (C1) to be obtained. The lower limit is more preferably 0.05% and the upper limit is more preferably 1%.

The core-shell type resin particles (C2) of the first invention may be resin particles produced by any method and process and a method of producing the core-shell type resin particles may be the following production methods (I) to (III).

(I): Production method for forming core-shell structure simultaneously with core particles production A method of dispersing a resin (b) [including its precursor (b0)] or its solvent solution in a water-based dispersion (W) of the resin particles (A) comprising a resin (a) and thereby forming the resin particles (B) comprising (b) in (W). In this case, simultaneously with the granulation of resin particles (B), the resin particles (A) adhere to the surface of (B) and a water-based dispersion (X1) of core-shell type resin particles (C1) is obtained and the core-shell type resin particles are obtained by removing the water-based solvent from the dispersion. In this case, if the surfaces of (C1) are not formed in a film-like form, the treatment for making a film-like form may be carried out and this process may be carried out in any step after production of (X1).

(II): Production method for forming core-shell type resin particles (C2) by coating previously produced resin particles (B) comprising the resin (b) with a coating agent (W') comprising the resin (a) and further making the shell layer in form of a film if necessary. In this case, the coating agent (W') may be in any phase such as a liquid or solid or the like and further may be applied a precursor (a') of (a) for coating and then subjected to reaction to convert (a') into (a). (B) to be used may be resin particles produced by any production method, for example, resin particles produced by an emulsion polymerization and coagulation method or resin particles produced by a pulverization method. The coating method is not particularly limited and a method of dispersing previously produced resin particles (B) or dispersion of (B) in the water-based dispersion (W) of the resin particles (A) comprising the resin (a) and a method of spraying an resin (a)-dissolved solution as a coating agent to (B) may be exemplified.

(III): Production method for producing core particles and converting the surface peripheries of the core particles into another shell resin by physical and/or chemical operation. A method of previously producing the resin particles (B) comprising the resin (b) and treating the surfaces of the particles (B) by heating and/or chemical treatment (with an acid or amine neutralization) to convert the mono-structure particles (B) into core-shell type resin particles (C2) can be exemplified.

Among them is the production method (I) preferable.

In the second, third, fourth, eighth, and tenth inventions and the above-mentioned production method (I) in the first invention, at the time of forming the resin particles (B) from the resin (b) by dispersing (b) or its solvent solution, alternatively a precursor (b0) of (b) or its solvent solution in the water-based dispersion (W) of the resin particles (A) comprising the resin (a) and if necessary an organic acid metal salt (m), the resin particles (A) are adsorbed on the surfaces of the resin particles (B) to prevent agglomeration of the resin particles (C1) one another and make (C1) difficult to be pulverized under high shearing condition. Accordingly, the particle diameters of (C1) are converged into a constant value and the evenness of the particle diameters is improved. Therefore, the resin particles (A) are preferable to have a strength high enough to avoid breakage by shearing at the temperature at the time of dispersion, to be hard to be dissolved in water or swollen with water, and to be hard to be dissolved in (b) or its solvent solution, (b0) or its solvent solution.

In the second invention, the sp value of the resin particles (A) to the resin particles (B) (the calculation method of sp value is according to the method described in Polymer Engineering and Science, February, 1974, vol. 14, No. 2. P. 147-154) and the molecular weight of the resin particles (A) are controlled to smooth the particle surfaces of the resin particles (C1).

In the second invention, resin (a) and resin (b) are selected so as to keep the point (K, H) within an area surrounded by a quadrangle defined by the following four points A, B, C, and D including the side lines in a system of K, H coordinates as shown in FIG. 1, wherein K denotes sp value difference ($\Delta$sp) of (a) and (b) and H denotes the natural logarithm ln(Mw) of the weight average molecular weight (Mw) of resin (a): A (0.3, ln 3000), B (1.5, ln 1000), C (1.3, ln 200000), and D (0.1, ln 200000).

The point (K, H) is more preferably within an area surrounded by a quadrangle defined by the following four points A', B', C', and D' including the sidelines and even more preferably within an area surrounded by a quadrangle defined by the following four points A', B', C', and D' including the side lines:

A' (0.3, ln 3200), B' (1.45, ln 1500), C' (1.3, ln 10000), and D' (0.15, ln 100000) and A'' (0.3, ln 3400), B'' (1.4, ln 2000), C'' (1.3, ln 50000), and D'' (0.2, ln 50000).

In the case the point (K, H) exists below the straight line AB, at the time of granulation, the resin particles (A) become easy to be dissolved in a solvent or the like and granulation may not be carried out well in some cases. Also, in the case the point (K, H) exists above the straight line CD, the resin particles (A) are not at all swollen with a solvent or the like and become hard to be thermally melted and therefore, the smoothness of the resin particles (C1) becomes insufficient to result in decrease of powder flowability in some cases. In the case the point (K, H) exists in the left of the straight line AD, since the sp value difference between the resin (a) and the resin (b) is so small as to dissolve the resin particles (A) in the solution of the resin (b), resulting in granulation difficulty. Further, in the case the point (K, H) exists in the right of the straight line BC, since the sp value difference between the resin (a) and the resin (b) is so big as to make the resin particles (A) completely unswollable in a solvent, resulting in insufficiency of the smoothness of the particles and decrease of flowability and in the case the point (K, H) is in further right, that is the sp value difference between the resin (a) and the resin (b) becomes bigger, the attraction power of the resin particles (A) to the resin particles (B) is decreased to lead to granulation difficulty.

In term of the suppression of dissolution or swelling of the resin particles (A) in water or a solvent to be used in the case of dispersion, it is preferable to properly adjust the molecular weight, sp value, crystallization property, and inter-crosslinking point molecular weight of the resin (a).

The number average molecular weight (measured by gel permeation chromatography, hereinafter, referred to as Mn) of the resin (a) is generally 100 to 5,000,000, preferably 200 to 5,000,000, and more preferably 500 to 500,000, and the sp value is generally 7 to 18 and preferably 8 to 14. The melting point of the resin (a) (measured by DSC) is generally 50° C. or higher and preferably 80 to 200° C. In the case the thermal resistance, water-resistance, chemical resistance, and evenness of the particle diameter of the resin particles (C) are to be improved, crosslinking structure may be introducing into the resin (a). Such crosslinking structure may be any crosslinking structure based on covalent bonding, coordination bonding, ion bonding, hydrogen bonding or the like. The inter-crosslinking point molecular weight in the case of introducing the crosslinking structure into the resin (a) is generally 50 or higher, preferably 500 or higher, and more preferably 1000 or higher.

In the present invention, the number average molecular weight (Mn) and the weight average molecular weight (Mw) of the resin are values measured by Gel Permeation Chromatography (GPC) with respect to a tetrahydrofuran (THF)-soluble portion of the resin under the following measurement conditions:

Apparatus (for an example): HLC-8120 manufactured by Tosoh

Column (for an example): TSKgelGMHXL (two of them) TSKgelMultiporeHXL-M (one of them)

Sample solution: a THF solution of 0.25% concentration

Volume of solution injected: 1001

Flow rate: 1 ml/min.

Measurement temperature: 40° C.

Detector: refractive index detector

Standard substance: standard polystyrene manufactured by Tosoh (TSKstandard POLYSTYRENE) twelve (12) points (Mw 500 1050 2800 5970 9100 18100 37900 96400 190000 355000 1090000 2890000)

Also, Mn and Mw of polyurethane resins usable for the resin (b) mentioned after are values measured by GPC under the following measurement conditions:

Apparatus (for an example): HLC-8220GPC manufactured by Tosoh

Column (for an example): Guardcolumn α TSKgel α-M

Sample solution: a dimethylformamide solution of 0.125% concentration

Volume of solution injected: 100 μl

Flow rate: 1 ml/min.

Measurement temperature: 40° C.

Detector: refractive index detector

Standard substance: standard polystyrene manufactured by Tosoh (TSKstandard POLYSTYRENE) twelve (12) points (Mw 500 1050 2800 5970 9100 18100 37900 96400 190000 355000 1090000 2890000)

The glass transition temperature (Tg) of the resin (a) is generally 20° C. to 250° C., preferably 30° C. to 230° C., more preferably 40° C. to 200° C., and even more preferably 50° C. to 100° C. in terms of the particle diameter evenness, powder flowability, thermal resistance at the time of storage, and stress resistance of the resin particles (C). If the Tg is lower than the temperature at which the water-based dispersion (X1) is produced, the effect to prevent agglomeration or breakdown is lessened and the effect to improve the evenness of the particle diameter is lessened.

Further, for the same reason, Tg of the resin particles (A) comprising (a) and if necessary (m) is preferably 20 to 200° C., more preferably 30 to 100° C., and even more preferably 40 to 80° C.

Tg in the invention is a value measured by DSC measurement or flow tester measurement (in the case measurement by DSC is impossible).

An overhead type flow tester CFT 500 model manufactured by Shimadzu Corp. is employed for the flow tester measurement. The conditions of the flow tester measurement are as follows and hereinafter, the measurement is all carried out under these conditions.

(Flow Tester Measurement Conditions)

Load: 30 kg/cm$^2$; heating speed: 3.0° C./min; die diameter: 0.50 mm; and die length: 10.0 mm.

Also, A point in the flow chart shown in FIG. 2 (the temperature at which a sample receives a compressive load and starts deforming) is defined to be the glass transition temperature (Tg): B point (the temperature at which the inner voids disappear and a single transparent body or phase with uniform appearance while keeping uneven stress distribution is produced) is defined to be an initial softening temperature (Ts): C point (the temperature at which a piston again starts descending after the piston is slightly elevated owing to thermal expansion of a sample) is defined to be the flow starting temperature (Tfb): and D point (the temperature at the point determined by calculating ½ of the difference between Smax at the flow finishing point and the minimum value 5 min in Fig. and adding X and 5 min) is defined as the flow temperature (T1/2).

In terms of the thermal resistance at the time storage, stress resistance, and fixing property on a paper sheet or the like, the initial softening temperature (Ts) of the resin (a) is preferably 40° C. to 270° C., more preferably 50° C. to 250° C., furthermore preferably 60° C. to 220° C., and even more preferably 70° C. to 160° C.: the flow temperature (T1/2) is preferably 60° C. to 300° C., more preferably 65° C. to 280° C., furthermore preferably 70° C. to 250° C., and even more preferably 80° C. to 180° C. In the case of using the resin particles for a toner, if the initial softening temperature (Ts) and flow temperature (T1/2) are high temperature, it may results in inferiority of low temperature fixing property and high luster. The initial softening temperature and the flow temperature in the invention are values measured by the above-mentioned flow tester measurement.

The temperature difference of the glass transition temperature (Tg) and the flow temperature (T1/2) of the resin (a) is preferably 0° C. to 120° C., more preferably 0° C. to 100° C., furthermore preferably 0° C. to 90° C., and even more preferably 0° C. to 80° C. If the temperature difference of the glass transition temperature and the flow temperature is within the above-mentioned range, in the case the resin particles are used for a toner, it becomes easy to simultaneously satisfy both of the thermal resistance at the time of storage and high luster of the resin particles.

The temperature difference of the glass transition temperature (Tg) and the initial softening temperature (Ts) of the resin (a) is preferably 0° C. to 100° C., more preferably 0° C. to 70° C., furthermore preferably 0° C. to 50° C., and even more preferably 0° C. to 35° C. If the temperature difference of the glass transition temperature and the initial softening temperature is within the above-mentioned range, in the case the resin particles are used for a toner, it becomes easy to simultaneously satisfy both of the thermal resistance at the time of storage and high luster of the resin particles.

The resin (a) to be used in the first and the third invention is a resin having all of an initial softening temperature in a range of 40 to 270° C., a glass transition temperature in a range of 20 to 250° C., a flow temperature in a range of 60 to 300° C., and the difference of the glass transition temperature and the flow temperature in a range of 0 to 120° C.

With respect to the Shore D hardness, which is a standardized hardness, the hardness of the resin particles (A) is generally 30 or higher and particularly preferably in a range of 45 to 100. Further, even in the case of immersion in water or in a solvent for a prescribed time, the hardness is preferable to be within the above-mentioned range.

The water-based dispersion (W) of the resin particles (A) may contain a solvent (e.g., acetone, methyl ethyl ketone, or the like) having affinity to water among solvents (u) described below other than water. In this case, the solvent to be added may be any solvent if it is that which does not cause agglomeration of the resin particles (A), which does not dissolve the resin particles (A), and which does not prevent the granulation of the resin particles (C1) and the content may also be optional, however it is preferable to use the amount of 40% or lower based on the total content of water and the solvent and it does not remain in the resin particles (C1) after drying.

A method for obtaining the water-based dispersion of the resin particles (A) from a resin (a) is not particularly limited and the following methods [1] to [8] can be exemplified.

[1] In the case of vinyl resins, a method of directly producing the water-based dispersion of the resin particles (A) by polymerization reaction such as a suspension polymerization method, an emulsification polymerization method, a seed polymerization method or a dispersion polymerization method from monomers as starting raw materials.

[2] In the case of addition polymerization or condensation type resins such as polyester resins, a method of dispersing a precursor (a monomer, an oligomer, and the like) or its solvent solution in a water-based solvent if necessary in the presence of a dispersant and thereafter carrying out curing step by heating or adding a curing agent to produce the water-based dispersion of the resin particles (A).

[3] In the case of addition polymerization or condensation type resins such as polyester resins, a method of dissolving a proper emulsifier in a precursor (a monomer, an oligomer, and the like) or its solvent solution (it is preferable to be a liquid. It may be liquefied by heating.), successively adding water for phase inversion emulsification, and carrying out curing by adding a curing agent to produce the water-based dispersion of the resin particles (A).

[4] A method of pulverizing a resin previously, which is produced by polymerization reaction (any polymerization reaction manner such as addition polymerization, ring-opening polymerization, polyaddition, addition condensation polymerization, and condensation polymerization), by mechanically rotating or jet type pulverizer, classifying the pulverized resin for obtaining resin particles, and dispersing the resin particles in water in the presence of a proper dispersant.

[5] A method of previously producing a resin by polymerization reaction (any polymerization reaction manner such as addition polymerization, ring-opening polymerization, polyaddition, addition condensation polymerization, and condensation polymerization), dissolving the obtained resin in a solvent, spraying the resin solution in atomized state for obtaining resin particles, and dispersing the resin particles in water in the presence of a proper dispersant.

[6] A method of previously producing a resin by polymerization reaction (any polymerization reaction manner such as addition polymerization, ring-opening polymerization, polyaddition, addition condensation polymerization, and condensation polymerization), dissolving the obtained resin in a solvent for obtaining a resin solution, either adding a poor solvent to the resin solution or cooling the resin solution for precipitating the resin particles, removing the solvent for obtaining the resin particles, and dispersing the resin particles in water in the presence of a proper dispersant.

[7] A method of previously producing a resin by polymerization reaction (any polymerization reaction manner such as addition polymerization, ring-opening polymerization, polyaddition, addition condensation polymerization, and condensation polymerization), dissolving the obtained resin in a solvent for obtaining a resin solution, dispersing the resin solution in water in the presence of a proper dispersant, and removing the solvent by heating or reducing pressure.

[8] A method of previously producing a resin by polymerization reaction (any polymerization reaction manner such as addition polymerization, ring-opening polymerization, polyaddition, addition condensation polymerization, and condensation polymerization), dissolving the obtained resin in a solvent for obtaining a resin solution, dissolving a proper emulsifier, and adding water for phase inversion emulsification.

In the above-mentioned methods [1]-[8], as the emulsifier or a dispersant to be used in combination, conventionally known surfactants (s) and water-soluble polymers (t) can be used. Also, an assisting agent for emulsification and dispersion, solvents (u) and plasticizers (v) may be used in combination.

The surfactants (s) may include anionic surfactants (s-1), cationic surfactants (s-2), amphoteric surfactants (s-3), and nonionic surfactants (s-4). Two or more kinds of surfactants may be employed as the surfactants (s). Practical examples of (s) may include the followings and those described in JP-A No. 2002-284881 as well.

As the anionic surfactants (s-1), carboxylic acids and their salts, sulfuric acid ester salts, salts of carboxymethylated compounds, sulfonic acid salts, and phosphoric acid esters can be employed.

Examples usable as the carboxylic acids and their salts may include saturated and unsaturated fatty acids having 8 to 22 carbon atoms and their salts and practically the examples are capric acid, lauric acid, myristic acid, palmitic acid, stearic acid, arachidinic acid, behenic acid, oleic acid, linoleic acid, and ricinoleic acid as well as mixtures of higher fatty acids obtained by saponification of coconut oil, palm nuclei oil, rice bran oil, and beef tallow.

Their salts may include sodium salts, potassium salts, amine salts, ammonium salts, quaternary ammonium salts, and alkanolamine salts (monoethanolamine salts, diethanolamine salts, and triethanolamine salts) of them.

Examples usable as the sulfuric acid ester salts may include higher alcohol sulfuric acid ester salts (sulfuric acid ester salts of aliphatic alcohol having 8 to 18 carbon atoms), higher alkyl ether sulfuric acid ester salts (sulfuric acid ester salts of EO or PO 1 to 10 mole adducts of aliphatic alcohol having 8 to 18 carbon atoms), sulfonated oils (natural unsaturated fats and oils or unsaturated waxes having 12 to 50 carbon atoms are reacted with sulfuric acid and neutralized), sulfonated fatty acid esters (lower alcohol (1 to 8 carbon atoms) esters of unsaturated fatty acids (6 to 40 carbon atoms) are reacted with sulfuric acid and neutralized), and sulfonated olefins (olefins having 12 to 18 carbon atoms are reacted with sulfuric acid and neutralized).

Their salts may include sodium salts, potassium salts, amine salts, ammonium salts, quaternary ammonium salts, and alkanolamine salts (monoethanolamine salts, diethanolamine salts, and triethanolamine salts) of them.

Examples usable as the higher alcohol sulfuric acid ester salts may include octyl alcohol sulfuric acid ester salts, decyl alcohol sulfuric acid ester salts, lauryl alcohol sulfuric acid ester salts, stearyl alcohol sulfuric acid ester salts, and sulfuric acid ester salts of alcohols synthesized using Ziegler catalyst (e.g., trade name: ALFOL 1214, manufactured by CONDEA), sulfuric acid ester salts of alcohols synthesized by oxo process (e.g., trade name: Dobanol 23, 25, 45 and Diadol 15-L, 115H, 135, manufactured by Mitsubishi Chemical Industries Ltd., trade name: Tridecanol, manufactured by Kyowa Hakko Kogyo Co., Ltd., trade name: Oxocol 1213, 1215, 1415, manufactured by Nissan Chemical Industries, Ltd.).

Examples usable as the higher alkyl ether sulfuric acid ester salts are lauryl alcohol EO 2 mole adduct sulfuric acid ester salts and octyl alcohol EO 3 mole adduct sulfuric acid ester salts Sulfonated oils may include sulfonated product salts of castor oil, peanut oil, olive oil, rapeseed oil, beef tallow, and sheep tallow.

Sulfonated fatty acid esters may include sulfonated product salts of butyl oleate and butyl ricinoleate.

Sulfonated olefins may include trade name: Teepol (manufactured by Shell).

Examples usable as the carboxymethylated compound salts are salts of carboxymethylated aliphatic alcohols having 8 to 16 carbon atoms and salts of carboxymethylated EO or PO 1 to 10 mole adducts of aliphatic alcohols having 8 to 16 carbon atoms.

Practical examples of carboxymethylated compound salts of aliphatic alcohols are octyl alcohol carboxymethylated sodium salt, lauryl alcohol carboxymethylated sodium salt, carboxymethylated sodium salt of Dobanol 23, and tridecanol carboxymethylated sodium salt.

Practical examples of salts of carboxymethylated EO 1 to 10 mole adducts of aliphatic alcohols are carboxymethylated octyl alcohol-EO 3 mole adduct sodium salt, carboxymethylated lauryl alcohol-EO 4 mole adduct sodium salt, and carboxymethylated tridecanol-EO 5 mole adduct sodium salt.

Examples usable as the sulfonic acid salts may include alkylbenzenesulfonic acid salts, alkylnaphthalenesulfonic acid salts, sulfosuccinic acid diester salts, α-olefinsulfonic acid salts, sulfonic acid salts of Igepon T type and other aromatic ring-containing compounds.

Practical examples of alkylbenzenesulfonic acid salts may include dodecylbenzenesulfonic acid sodium salt.

Practical examples of alkylnaphthalenesulfonic acid salts may include dodecylnapthalenesulfonic acid sodium salt.

Practical examples of sulfosuccinic acid diester salts may include sulfosuccinic acid di-2-ethylhexyl ester sodium salt.

Practical examples of sulfosuccinic acid salts of aromatic ring-containing compounds may include alkylated diphenyl ether mono- or disulfonic acid salts and styrenated phenolsulfonic acid salts.

Examples usable as the phosphoric acid ester salts may include higher alcohol phosphoric acid ester salts and higher alcohol EO adduct phosphoric acid ester salts.

Practical examples of higher alcohol phosphoric acid monoester salts are lauryl alcohol phosphoric acid ester disodium salt and lauryl alcohol phosphoric acid diester sodium salt.

Practical examples of higher alcohol EO adduct phosphoric acid ester salts may include oleyl alcohol EO 5 mole adduct phosphoric acid monoester disodium salt.

The cationic surfactants (s-2) may include quaternary ammonium salts type surfactants and amine salts type surfactants.

Examples usable as the quaternary ammonium salt type surfactants are those obtained by reaction of tertiary amines having 3 to 40 carbon atoms with quaternarization agents (e.g., alkylation agents such as methyl chloride, methyl bromide, ethyl chloride, benzyl chloride, and dimethylsulfuric acid and EO) and practical examples are lauryltrimethylammonium chloride, didecyldimethylammonium chloride, dioctyldimethylammonium bromide, stearyltrimethylammonium bromide, lauryldimethylbenzylammonium chloride (benzalconium chloride), cetylpyridinium chloride, polyoxyethylenetrimethylammonium chloride, and stearamidoethyldiethylmethylammonium methosulfate.

Examples usable as the amine salt type surfactants are those obtained by neutralization of primary to tertiary amines with inorganic acids (e.g., hydrochloric acid, nitric acid, sulfuric acid, hydroiodic acid, phosphoric acid, and perchloric acid) or organic acids (e.g., acetic acid, formic acid, oxalic acid, lactic acid, gluconic acid, adipic acid, alkylphosphoric acid having 2 to 24 carbon atoms, malic acid, and citric acid).

Examples of the primary amine type surfactants may include inorganic acid salts or organic acid salts of aliphatic higher amines having 8 to 40 carbon atoms (e.g., higher amines such as laurylamine, stearylamine, cetylamine, cured beef tallow amine, and rosin amine), and higher fatty acid (having 8 to 40 carbon atoms, e.g., stearic acid and oleic acid) salts of lower amines (having 2 to 6 carbon atoms).

Examples of the secondary amine type surfactants may include inorganic acid salts or organic acid salts of EO adducts of aliphatic amines having 4 to 40 carbon atoms.

Examples of the tertiary amine type surfactants may include inorganic acid salts or organic acid salts of aliphatic amines having 4 to 40 carbon atoms (e.g., triethylamine, ethyldimethylamine, and N,N,N',N'-tetramethylethylenediamine), aliphatic amine (having 2 to 40 carbon atoms) EO (2 mole or higher) adducts, alicyclic amines having 6 to 40 carbon atoms (e.g., N-methylpyrolidine, N-methylpiperidine, N-methylhexamethyleneimine, N-methylmorpholine, and 1,8-diazabicyclo(5,4,0)-7-undecene), and nitrogen-containing heteroring aromatic amines having 5 to 30 carbon atoms (e.g., 4-dimethylaminopyridine, N-methylimidazole, and 4,4'-dipyridyl) and inorganic acid salts or organic acid salts of tertiary amines such as triethanolamine monostearate and stearamidoethyldiethylmethylethanolamine.

Examples usable as the amphoteric surfactants (s-3) may include carboxylic acid salt type amphoteric surfactants, sulfuric acid ester salt type amphoteric surfactants, sulfonic acid salt type amphoteric surfactants, and phosphoric acid ester salt type amphoteric surfactants.

Examples of carboxylic acid salt type amphoteric surfactants are aminoacid type amphoteric surfactants, betaine type amphoteric surfactants, and imidazoline type amphoteric surfactants. The aminoacid type amphoteric surfactants are amphoteric surfactants having amino group and carboxyl group in a molecule and, for example, compounds defined by the following formula (2) can be exemplified:

$$[R-NH-(CH_2)_n-COO]_m M \qquad (2)$$

wherein R denotes monovalent hydrocarbon group; n denotes 1 or 2; m denotes 1 or 2; M denotes hydrogen ion, an alkali metal ion, an alkaline earth metal ion, ammonium cation, amine cation, and alkanol amine cation.

Practical examples of the amphoteric surfactants defined by the formula (2) are alkyl (6 to 40 carbon atoms)-aminopropionic acid type amphoteric surfactants (stearylaminopropionic acid sodium salt and laurylaminopropionic acid sodium salt); alkyl (4 to 24 carbon atoms)-aminoacetic acid type amphoteric surfactants (laurylaminoacetic acid sodium salt).

The betaine type amphoteric surfactants are amphoteric surfactants each comprising a quaternary ammonium salt type cationic portion and a carboxylic acid type anion portion in a molecule and examples of the amphoteric surfactants are alkyl (6 to 40 carbon atoms) dimethyl betaine (stearyl dimethylaminoacetic acid betaine and lauryl dimethylaminoacetic acid betaine), amidbetaine having 6 to 40 carbon atoms (copra oil amidpropylbetain) and alkyl (6 to 40 carbon atoms) dihydroxyalkylbetaine (lauryl dihydroxyethyl betaine).

The imidazoline type amphoteric surfactants are amphoteric surfactants each comprising an imidazoline ring-containing cationic portion and a carboxylic acid type anion portion in a molecule and examples may include 2-undecyl-N-carboxymethyl-N-hydroxyethylimidazolinium betaine.

Examples of other amphoteric surfactants are glycine type amphoteric surfactants such as sodium lauroyl glycine, sodium lauryldiaminoethyl glycine, lauryldiaminoethyl glycine hydrochloride, and dioctyldiaminoethyl glycine hydrochloride; sulfobetaine type amphoteric surfactants such as pentadecylsulfotaurine, sulfonic acid salt type amphoteric surfactants, and phosphoric acid ester salt type amphoteric surfactants.

The nonionic surfactants (s-4) may include AO adduct type nonionic surfactants and polyhydric alcohol type nonionic surfactants.

The AO adduct type nonionic surfactants may be obtained by directly adding AO (2 to 20 carbon atoms) to higher alcohols having 8 to 40 carbon atoms, higher fatty acids having 8 to 40 carbon atoms, or alkylamines having 8 to 40 carbon atoms, or causing reaction of higher fatty acids with polyalkylene glycols obtained by AO addition to glycols, or adding AO to higher fatty acid amides.

AO includes EO, PO, and BO

Preferable examples among them are EO and random or block adducts of EO and PO.

The addition mole number of AO is preferably 10 to 50 mole and those containing 50 to 100% of EO among AO are preferable.

The AO addition type nonionic surfactants may include oxyalkylene alkyl ethers (2 to 24 carbon atoms for alkylene and 8 to 40 carbon atoms for alkyl) (e.g., octyl alcohol EO 20 mole adduct, lauryl alcohol EO 20 mole adduct, stearyl alcohol EO 10 mole adduct, oleyl alcohol EO 5 mole adduct, and lauryl alcohol EO 10 mole-PO 20 mole block adduct); polyoxyalkylene higher fatty acid esters (2 to 24 carbon atoms for alkylene and 8 to 40 carbon atoms for higher fatty acid) (e.g., stearyl acid EO 10 mole adduct and laurylic acid EO 10 mole adduct); polyoxyalkylene polyhydric alcohol higher fatty acid esters (2 to 24 carbon atoms for alkylene, 3 to 40 carbon atoms for polyhydric alcohol, and 8 to 40 carbon atoms for higher fatty acid) (e.g., polyethylene glycol (polymerization degree 20) lauric acid diester and polyethylene glycol (polymerization degree 20) oleic acid diester); polyoxyalkylene alkyl phenyl ethers (2 to 24 carbon atoms for alkylene and 8 to 40 carbon atoms for alkyl) (e.g., nonylphenol EO 4 mole adduct, nonylphenol EO 8 mole-PO 20 mole block adduct, octylphenol EO 10 mole adduct, bisphenol A-EO 10 mole adduct, and styrene-modified phenol EO 20 mole adduct); polyoxyalkylene alkyl aminoethers (2 to 24 carbon atoms for alkylene and 8 to 40 carbon atoms for alkyl) (e.g., laurylamine EO 10 mole adduct and stearylamine EO 10 mole adduct); and polyoxyalkylene alkanolamides (2 to 24 carbon atoms for alkylene and 8 to 40 carbon atoms for amide (acyl portion)) (e.g., hydroxyethyl-lauric acid amide EO 10 mole adduct and hydroxypropyloleic acid amide EO 20 mole adduct).

The polyhydric alcohol type nonionic surfactants may include polyhydric alcohol fatty acid esters, polyhydric alcohol fatty acid ester AO adducts, polyhydric alcohol alkyl ethers, and polyhydric alcohol alkyl ether AO adducts. The number of carbon atoms for the polyalcohol is 3 to 24; the number of carbon atoms for the fatty acid is 8 to 40; and the number of carbon atoms for AO is 2 to 24.

Examples of the polyhydric alcohol fatty acid esters are pentaerythritol monolaurate, pentaerythritol monooleate, sorbitane monolaurate, sorbitane monostearate, sorbitane dilaurate, sorbitane dioleate, and sucrose monostearate.

Examples of the polyhydric alcohol fatty acid ester AO adducts are ethylene glycol monooleate EO 10 mole adduct, ethylene glycol monostearate EO 20 mole adduct, trimethylolpropane stearate EO 20 mole-PO 10 mole random adduct, sorbitane monolaurate EO 10 mole adduct, sorbitane distearate EO 20 mole adduct, and sorbitane dilaurate EO 12 mole-PO 24 mole random adduct.

Examples of the polyhydric alcohol alkyl ethers are pentaerythritol monobutyl ether, pentaerythritol monolauryl ether, sorbitane monomethyl ether, sorbitane monostearyl ether, methyl glycoside, and lauryl glycoside.

Examples of polyhydric alcohol alkyl ether AO adducts are sorbitane monostearyl ether EO 10 mole adduct, methyl glycoside EO 20 mole-PO 10 mole random adduct, lauryl glycoside EO 10 mole adduct, and stearyl glycoside EO 20 mole-PO 20 mole random adduct.

The water soluble polymer (t) may include cellulose type compounds (e.g., methyl cellulose, ethyl cellulose, hydroxyethyl cellulose, ethyl hydroxyethyl cellulose, carboxymethyl cellulose, hydroxypropyl cellulose, and their saponified products); gelatin, starch, dextrin, gum arabic, chitin, chitosan, polyvinyl alcohol, polyvinylpyrrolidone, polyethylene glycol, polyethyleneimine, polyacrylamide, acrylic acid (salt)-containing polymers (e.g., poly(acrylic acid) sodium salt, poly(acrylic acid) potassium salt, poly(acrylic acid) ammonium salt, poly(acrylic acid) partially neutralized with sodium hydroxide, sodium acrylate-acrylic acid ester copolymer); styrene-maleic anhydride copolymer (partially) neutralized with sodium hydroxide, water-soluble polyurethanes (e.g., reaction products of polyethylene glycol and polycaprolactone diol with polyisocyanate).

The solvent (u) to be used in the invention may be added to a water-based solvent or to a dispersion to be emulsified [in the oil phase containing the resin (b) or (b0)] based on the necessity at the time of emulsification.

Practical examples of the solvent (u) are aromatic hydrocarbon solvents such as toluene, xylene, ethylbenzene, and tetralin; aliphatic or alicyclic hydrocarbon solvents such as n-hexane, n-heptane, mineral spirit, and cyclohexane; halogen type solvents such as methyl chloride, methyl bromide, methyl iodide, methylene dichloride, perchloromethane, trichloroethylene, and perchloroethylene; ester or ester ether type solvents such as ethyl acetate, butyl acetate, methoxybutyl acetate, methylcellosolve acetate, and ethylcellosolve acetate; ether type solvents such as diethyl ether, tetrahydrofuran, dioxane, ethyl cellosolve, butyl cellosolve, and propylene glycol monomethyl ether; ketone type solvents such as acetone, methyl ethyl ketone, methyl isobutyl ketone, di-n-butylketone, and cyclohexanone; alcohol type solvents such as methanol, ethanol, n-propanol, isopropanol, n-butanol, isobutanol, tert-butanol, 2-ethylhexyl alcohol, and benzyl alcohol; amide type solvents such as dimethylformamide and dimethylacetamide; sulfoxide type solvents such as dimethyl sulfoxide; heterocyclic compound type solvents such as N-methylpyrrolidone; and mixed solvents of two or more of the above exemplified solvents.

The plasticizer (v) may be added to the water-based solvent or to a dispersion to be emulsified [in the oil phase containing the resin (b) or (b0)] based on the necessity at the time of emulsification.

The plasticizer (v) is not necessarily limited and the following can be exemplified:

(v1) phthalic acid esters [e.g., dibutyl phthalate, dioctyl phthalate, butyl benzyl phthalate, and diisodecyl phthalate];

(v2) aliphatic di-basic acid esters [e.g., di-2-ethylhexyl adipate and 2-ethylhexyl sebacate];

(v3) trimellitic acid esters [e.g., tri-2-ethylhexyl trimellitate and trioctyl trimellitate];

(v4) phosphoric acid esters [e.g., triethyl phosphate, tri-2-ethylhexyl phosphate, and tricresyl phosphate];

(v5) fatty acid esters [e.g., butyl oleate]; and (v6) mixtures of two or more of the above exemplified esters.

The particle diameters of the resin particles (A) to be used in the invention is generally smaller than those of the resin particles (B) to be formed and in terms of the particle diameter evenness, the particle diameter ratio of [volume average particle diameter of resin particles (A)]/[volume average particle diameter of resin particles (B)] is preferably in a range of 0.001 to 0.3. The lower limit of the particle diameter ratio is more preferably 0.003 and the upper limit is more preferably 0.25. If the particle diameter ratio is larger than 0.3, since (A) cannot efficiently be attached on the surface of (B), the particle distribution of (C) to be obtained tends to be widened.

The volume average particle diameter of the resin particles (A) is properly adjusted within the above-mentioned particle diameter ratio so as to obtain resin particles (C) with desired particle diameters.

The volume average particle diameter of (A) is generally preferably 0.0005 to 30 μm. The upper limit is more preferably 20 μm and even more preferably 10 μm and the lower limit is preferably 0.01 μm, more preferably 0.02 μm, and even more preferably 0.04 μm. However, in the case the resin particles (C) with a volume average particle diameter of 1 μm are to be obtained, it is preferably within a range of 0.0005 to 0.3 μm and more preferably within a range of 0.001 to 0.2 μm; in the case the resin particles (C) with a volume average particle diameter of 10 μm are to be obtained, it is preferably within a range of 0.005 to 3 μm and more preferably within a range of 0.05 to 2 μm; and in the case the resin particles (C) with a volume average particle diameter of 100 μm are to be obtained, it is preferably within a range of 0.05 to 30 μm and more preferably within a range of 0.1 to 20 μm.

The volume average particle diameter can be measured by laser type particle diameter distribution measurement apparatus LA-920 (manufactured by Horiba Seisakusho), Multisizer III (manufactured by Coulter), and as an optical type, ELS-800 (manufactured by Otsuka Electronics Co., Ltd.) using Laser Doppler method. If the values of the particle diameter measured by the respective measurement apparatuses are different from one another, the measurement values of ELS-800 are employed.

In this connection, since the above-mentioned particle diameter ratio is easy to be attained, the volume average particle diameter of the resin particles (B) described later is preferably in a range of 0.1 to 300 μm, more preferably in a range of 0.5 to 250 μm, and even more preferably in a range of 1 to 200 μm.

The resin (b) of the invention may be any resin if it is conventionally known resin and practical examples to be used as the resin are those exemplified for (a) and polyurethane resins mentioned below. Depending on the uses and purposes, (b) may be selected properly.

Generally, preferable examples of the resin (b) are polyester resins, polyurethane resins, epoxy resins, vinyl resins and their combinations; more preferable examples are polyurethane resins and polyester resins; and even more preferable examples are polyurethane resins and polyester resins containing 1,2-propylene glycol as a constituent unit.

The polyurethane resin may include addition polymerized products of polyisocyanates (15) and active hydrogen-containing compounds {water, polyols [abovementioned diols (11) [including diols (11a) containing a functional group other than hydroxyl], and tri to octa or higher-hydric polyols (12)], polycarboxylic acids [dicarboxylic acids (13) and tri to hexa or higher valent polycarboxylic acids (14)], polyester polyols obtained by condensation polymerization of polyols and polycarboxylic acids, ring opening reaction polymers of lactones having 6 to 12 carbon atoms, polyamines (16), polythiols (17) and combinations thereof} as well as amino-containing polyurethane resins obtained by causing reaction the terminal isocyanate groups of the prepolymers, which obtained by reaction (15) with active hydrogen-containing compounds, with primary and/or secondary monoamines (18) in the equimolecular amount to that of the isocyanate groups of the prepolymers. The content of carboxyl groups in the polyurethane resin is preferably 0.1 to 10%.

Polyisocyanates (15) may include aromatic polyisocyanates having 6 to 20 carbon atoms (except the carbon in the NCO group, hereinafter the same); aliphatic polyisocyanates having 2 to 18 carbon atoms; alicyclic polyisocyanates having 4 to 15 carbon atoms; aromatic aliphatic polyisocyanates having 8 to 15 carbon atoms; and modified compounds of these polyisocyanates (e.g., modified compounds containing urethane group, carbodiimido group, allophanato group, urea group, biurat group, uretdione group, uretimine group, isocyanurate group, and oxazolidone group) and mixture of two or more of them.

Practical examples of the above-mentioned polyisocyanates are 1,3- and/or 1,4-phenylene diisocyanate, 2,4- and/or 2,6-tolylene diisocyanate (TDI), crude TDI, 2,4'- and/or 4,4'-diphenylmethanediisocyanate (MDI), crude MDI [e.g., crude diaminophenylmethane [condensation products of formaldehyde and aromatic amines (aniline) or their mixtures: phosgene compounds of mixtures of diaminodiphenylmethane and a small amount (e.g., 5 to 20%) of tri- or higher functional polyamines]; polyallyl polyisocyanate (PAPI)], 1,5-naphthylenediisocyanate, 4,4',4"-triphenylmethane triisocyanate, m- and p-isocyanatophenylsulfonyl isocyanate.

Practical examples of the above-mentioned aliphatic polyisocyanates are ethylene diisocyanate, tetramethylene diisocyanate, hexamethylene diisocyanate (HDI), dodecamethylene diisocyanate, 1,6,11-undecatriisocyanate, 2,2,4-trimethylhexamethylene diisocyanate, lysine diisocyanate, 2,6-diisocyanatomethylcaproate, bis(2-isocyanatoethyl) fumarate, bis(2-isocyanatoethyl) carbonate, and 2-isocyanatoethyl-2,6-diisocyanatohexanoate.

Practical examples of the above-mentioned alicyclic polyisocyanates are isophorone diisocyanate (IPDI), dicyclohexylmethae-4,4'-diisocyanate (hydrated MDI), cyclohexylene diisocyanate, methylcyclohexylene diisocyanate (hydrated TDI), bis(2-isocyanatoethyl)-4-cyclohexene-1,2-dicarboxylate, and 2,5- and/or 2,6-norbornane diisocyanate.

Practical examples of the above-mentioned aromatic aliphatic polyisocyanates are m- and/or p-xylylene diisocyanate (XDI), α,α,α',α'-tetramethylxylylene diisocyanate (TMXDI).

Examples of the modified compounds of the above-mentioned polyisocyanates are modified compounds having urethane group, carbodiimido group, allophanato group, urea group, biurat group, uretdione group, uretimine group, isocyanurate group, and oxazolidone group.

Practically, polyisocyanate modified compounds such as modified MDI (e.g., urethane-modified MDI, carbodiimido-modified MDI, and trihydrocarbylphosphate-modified MDI) and urethane-modified MDI; and mixtures of two or more of these compounds [e.g., combination use of modified MDI and urethane-modified TDI (isocyanate-containing prepolymers)].

Those preferable among them are aromatic polyisocyanates having 6 to 15 carbon atoms, aliphatic polyisocyanates having 4 to 12 carbon atoms, and alicyclic polyisocyanates having 4 to 15 carbon atoms and those particularly preferable are TDI, MDI, HDI, hydrogenated MDI, and IPDI.

Examples of polyamines (16) are aliphatic polyamines (C2 to C18): [1] aliphatic polyamines {C2 to C6 alkylene diamine (e.g., ethylenediamine, propylenediamine, trimethylenediamine, tetramethylenediamine, and hexamethylenediamine), polyalkylene (C2 to C6) polyamines [e.g., diethylenetriamine, iminobispropylamine, bis(hexamethylene)triamine, triethylenetetramine, tetraethylenepentamine, and pentaethylenehexamine]}; [2] these polyamines substituted with alkyl (C1 to C4) or hydroxyalkyl (C2 to C4) [e.g. dialkyl (C1 to C3) aminopropylamine, trimethylhexmethylenediamine, aminoethylethanolamine, 2,5-dimethyl-2,5-hexamethylenediamine, and methyliminobispropylamine]; [3] alicyclic or heteroring-containing aliphatic polyamines [e.g., 3,9-bis(3-aminopropyl)-2,4,8,10-tetraoxaspiro[5,5]undecane]; [4] aromatic group-containing aliphatic amines (C8 to C 15) (e.g. xylylenediamine, tetrachloro-p-xylylenediamine), alicyclic polyamines (C4 to C15) (e.g., 1,3-diaminocyclohexane, isophoronediamine, menthenediamine, and 4,4'-methylenedicyclohexanediamine (hydrogenated methylenedianiline)); and heterocyclic polyamines (C4 to C15) (e.g., piperazine, N-aminoethylpiperazine, 1,4-diaminoethylpiperazine, and 1,4-bis(2-amino-2-methylpropyl)piperazine): aromatic polyamines (C6 to C20): [1] un-substituted aromatic polyamines [e.g., 1,2-, 1,3-, and 1,4-phenylenediamine, 2,4'- and 4,4'-diphenylmethanediamine, crude diphenylmethanediamine (polyphenylpolymethylenepolyamine), diaminodipenylsulfone, benzidine, thiodianiline, bis(3,4-diaminophenyl)sulfone, 2,6-diaminopyridine, m-aminobenzylamine, triphenylmethane-4,4',4''-triamine, and naphthylenediamine]; aromatic polyamines nuclear substituted with alkyl (C1 to C4 alkyl such as methyl, ethyl, n- and iso-propyl, and butyl) [e.g., 2,4- and 2,6-tolylenediamine, crude tolylenediamine, diethyltolylenediamine, 4,4'-diamino-3,3'-dimethyldiphenylmethane, 4,4'-bis(o-toluidine), dianicsidine, diaminoditolylsulfone, 1,3-dimethyl-2,4-diaminobenzene, 1,3-dimethyl-2,6-diaminobenzene, 1,4-diisopropyl-2,5-diaminobenzene, 2,4-diaminomesitylene, 1-methyl-3,5-diethyl-2,4-diaminobenzene, 2,3-dimethyl-1,4-diaminonaphthalene, 2,6-dimethyl-1,5-diaminonaphthalene, 3,3',5,5'-tetramethylbendizine, 3,3',5,5'-tetramethyl-4,4'-diaminodiphenylmethane, 3,5-diethyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraethyl-4,4'-diaminodiphenyl ether, 3,3',5,5'-tetraisopropyl-4,4'-diaminodiphenylsulfone] and mixtures of these isomers at various ratios; [3] aromatic polyamines having nuclear substituted electron attractive group (e.g., halogens such as Cl, Br, I, and F; alkoxy groups such as methoxy and ethoxy; and nitro groups) [e.g., methylene bis(o-chloroaniline), 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, 4,4'-diamino-3,3'-dimethyl-5,5'-dibromodiphenylmethane, 3,3'-dichlorobenzidine, 3,3'-dimethoxybenzidine, bis(4-amino-3-chlorophenyl) oxide, bis(4-amino-3-methoxyphenyl) propane, bis(4-amino-2-chlorophenyl)sulfone, bis(4-amino-3-methoxyphenyl)decane, bis(4-aminophenyl) sulfide, bis(4-aminophenyl) telluride, bis(4-aminophenyl) selenide, bis(4-amino-3-methoxyphenyl) disulfide, 4,4'-methylenebis(2-iodoaniline), 4,4'-methylenebis(2-bromoaniline), 4,4'-methylenebis(2-fluoroaniline), and 4-aminophenyl-2-chloroaniline]; [4] aromatic polyamines having secondary amino groups [some or all of —NH$_2$ of the aromatic polyamines of [1] to [3] are substituted with —NH—R' (R' is a lower alkyl such as methyl and ethyl)] [e.g., 4,4'-di(methylamino)diphenylmethane and 1-methyl-2-methylamino-4-aminobenzene], polyamidopolyamines [e.g., low molecular weight polyamidopolyamines obtained by condensation of dicarboxylic acids (e.g., dimer acids) and excess amounts (2 mole or more per 1 mole of acids) of polyamines (the above-mentioned alkylenediamines and polyalkylene polyamines); and polyether polyamines (e.g., cyanoethylated polyether polyol (polyalkylene glycol) hydrides).

Examples of polythiols (17) may include alkane dithiols having 2 to 36 carbon atoms (e.g., ethylenedithiol, 1,4-butanedithiol, and 1,6-hexanedithiol).

Examples of primary and/or secondary monoamines (18) may include alkylamines having 2 to 24 carbon atoms (e.g., ethylamine, n-butylamine, and isobutylamine).

The Mn, melting point, Ts, and sp value of the resin (b) may properly be adjusted in preferable ranges, respectively, in accordance with the uses.

The sp value of the resin (b) is preferable to satisfy the sp value difference from that of the resin (a) within a range defined in the second invention and it is generally within a range of 7 to 18, preferably within a range of 8 to 14, and more preferably within a range of 9 to 14.

For example, in the case the resin particles (C) and resin particles (B) are used for a resin for slush molding or a powder coating, Mn of (b) is generally in a range of 2,000 to 500,000 and preferably in a range of 4,000 to 200,000. The melting point (measured by DSC, hereinafter, the melting point is a value measured by DSC) of (b) is generally in a range of 0° C. to 200° C. and preferably 35° C. to 150° C. Tg of (b) is generally in a range of −60° C. to 100° C. and preferably −30° C. to 60° C.

In the case of using (b) for a spacer for producing electronic parts or apparatus such as a liquid crystal display and a standard particle for electron measurement instruments, Mn of (b) is generally in a range of 20,000 to 10,000,000 and preferably 40,000 to 2,000,000. The melting point (measured by DSC, hereinafter, the melting point is a value measured by DSC) of (b) is generally in a range of 40° C. to 300° C. and preferably 70° C. to 250° C. Tg of (b) is generally in a range of −0° C. to 250° C. and preferably 50° C. to 200° C.

In the case of using (b) for a toner to be used for electrophotograph, electrostatic recording, and electrostatic printing, Mn of (b) is generally in a range of 1,000 to 5,000,000 and preferably 2,000 to 500,000. The melting point (measured by DSC, hereinafter, the melting point is a value measured by DSC) of (b) is generally in a range of 20° C. to 300° C. and preferably 80° C. to 250° C. Tg of (b) is generally in a range of 20° C. to 200° C. and preferably 40° C. to 200° C. The sp value of (b) is generally in a range of 8 to 16 and preferably 9 to 14.

In the first invention, the attraction power of the resin (a) composing the core layer (Q) to the resin (b) composing the shell layer (P) can be controlled by the following methods.

[1]: If the resin (a) and the resin (b) are made to have mutually reversed electric charge, the attraction power is generated and in this case, if the electric charge of the resin (a) and the resin (b) are made higher, the attraction power becomes more strong and the shell resin (a) is prevented from peeling off the core resin (b).

[2]: If both of the resin (a) and the resin (b) are made to have electric charge with the mutually same polarity (both are made positive or both are made negative), the attraction power of the shell resin (a) to the core resin (b) is weakened to make formation of the core-shell form difficult and even if it is formed once, the shell resin (a) sometimes peels off the core resin (b). In this case, generally if the surfactant (s) and/or the water-soluble polymer (t) [particularly having opposed electric charge to that of the resin particles (A) and the resin particles (B)] is used, the attraction power is provided and therefore, it becomes easy to form the core-shell form or the shell resin (a) is prevented from peeling off the core resin (b).

[3]: In the case of producing the water-based dispersion (W) and the coating agent (W'), which is a water-based liquid, if the resin (a) is a resin having an acidic functional group such as carboxyl group, phosphoric acid group, and sulfonic acid group (generally it is preferable that the molecular weight per one acidic functional group is 1,000 or lower), the attraction power becomes stronger as the pH of the water-based solvent is lower. On the contrary, the attraction power becomes weaker as the pH of the water-based solvent is higher.

[4]: In the case of producing the water-based dispersion (W) or the coating agent (W'), which is a water-based liquid, if the resin (a) is a resin having a basic functional group such as primary amino group, secondary amino group, tertiary amino group, and quaternary ammonium group (generally it is preferable that the molecular weight per one basic functional group is 1,000 or lower), the attraction power becomes stronger as the pH of the water-based solvent is higher. On the contrary, the attraction power becomes weaker as the pH of the water-based solvent is lower.

[5]: The attraction power becomes stronger if the sp value difference (Δsp) of the resin (a) and the resin (b) is made narrower. However, if the Δsp value is made too narrow, sometimes the resin (a) and the resin (b) are dissolved to make it impossible to form core-shell type particles.

In the above-mentioned production methods (I) to (III), in the case the resin particles (C2) are produced in a water-based solvent, the resin particles (C2) are obtained by removing the water-based solvent from the water-based dispersion of the resin particles. A method for removing the water-based solvent may be as follows

[1]: A method of drying the water-based resin dispersion in reduced pressure or normal pressure.

[2]: A method of solid-liquid separating the dispersion by a centrifugal separator, Sparkler filter, or a filter press and drying the obtained powder.

[3]: A method of freezing the water-based resin dispersion and then drying the dispersion (so-called freeze-drying).

In the above [1] and [2], at the time of drying the obtained powder, conventionally known facilities such as a fluidized layer type drying apparatus, a pressure reduction drying apparatus, and an air circulation drying apparatus may be employed.

Further, if necessary, an air blowing classifier may be employed for classification and adjustment of particle size distribution.

The shape of the resin particles (C2) of the first invention may be controlled by the following methods in accordance with the above-mentioned production methods.

(1) In the Case of Production Method (I)

The particle shape and the particle surface property can be controlled by controlling sp value difference of the resin particles (A) and the resin particles (B) and the molecular weight of the resin particles (A). If the sp value difference is narrow, particles with smooth surface and irregular shape are easily obtained and if the sp value difference is wide, particles with rough surface and spherical shape are easily obtained. Also, if the molecular weight of (A) is high, particles with rough surface are easily obtained and if the molecular weight is low, particles with smooth surface are easily obtained. However, if the sp value difference of (A) and (B) is too narrow or too wide, the granulation becomes difficult. Also, if the molecular weight of the resin particles (A) is too small, the granulation becomes difficult. Accordingly, the sp value difference of (A) and (B) is preferably in a range of 0.01 to 5.0, more preferably in a range of 0.1 to 3.0, and even more preferably in a range of 0.2 to 2.0. Further, the weight average molecular weight of the resin particles (A) is preferably in a range of 100 to 1,000,000, more preferably in a range of 1000 to 500,000, furthermore preferably in a range of 2000 to 200,000, and even more preferably in a range of 3000 to 100,000.

(2) In the Case of Production Method (II) and Production Method (III)

In both production methods, the shape of the resin particles (B) to be produced previously considerably affect the particle shape and the resin particles (C2) are formed in approximately same shape as that of the resin particles (B). In the case (B) have irregular shape, if a higher amount of the coating agent (W') is used in the production method (II), the shape becomes spherical. Further, in the production method (III), if heating treatment is carried out at a temperature higher than Tg of (B), (C2) become spherical.

In terms of the particle diameter evenness, powder flowability, and storage stability of the resin particles (C2), the surface of the core layer (Q) is covered with the shell layer (P) preferably at 70% or higher, more preferably 80% or higher, furthermore preferably 90% or higher, and even more preferably 95% or higher. The surface coverage is calculated according to the following equation from the results of image analysis of an image obtained by a scanning electron microscope (SEM).

Surface coverage (%)=[surface area of (P)–covered portion/surface area of (P)–covered portion+Q–exposed portion]×100.

In the second, third, fourth, eighth, and tenth inventions and in the above-mentioned production method (I) for obtaining the resin particles of the first invention, the attraction power of the resin particles (A) to the resin particles (B) can be controlled by the following methods.

[1]: At the time of producing the water-based dispersion (W), if the resin particles (A) and the resin particles (B) are made to have mutually reversed electric charge, the attraction power is generated and in this case, if the electric charge of the resin particles (A) and the resin particles (B) are respectively made higher, the attraction power becomes more strong and the coverage of particles (A) on the resin particles (B) become higher.

[2]: At the time of producing the water-based dispersion (W), if both of the resin particles (A) and the resin particles (B) are made to have electric charge with the mutually same polarity (both are made positive or both are made negative), the coverage tends to be decreased. In this case, generally if the surfactant (s) and/or the water-soluble polymer (t) [particularly having opposed electric charge to that of the resin particles (A) and the resin particles (B)] is used, the coverage is increased.

[3]: At the time of producing the water-based dispersion (W), if the resin (a) is a resin having an acidic functional group such as carboxyl group, phosphoric acid group, and sulfonic acid group (generally it is preferable that the molecular weight per one acidic functional group is 1,000 or lower), the coverage is increased more as the pH of the water-based solvent is lower. On the contrary, the coverage is decreased as the pH is higher.

[4]: At the time of producing the water-based dispersion (W), if the resin (a) is a resin having a basic functional group such as primary amino group, secondary amino group, tertiary amino group, and quaternary ammonium group (generally it is preferable that the molecular weight per one basic functional group is 1,000 or lower), the coverage is increased more as the pH of the water-based solvent is higher. On the contrary, the coverage is decreased as the pH is lower.

[5]: The coverage is increased more if the sp value difference ($\Delta$sp) of the resin particles (A) and the resin particles (B) is made narrower.

In the second, third, fourth, eighth, and tenth inventions and in the above-mentioned production method (I) for obtaining the resin particles of the first invention, the water-based resin dispersion (X1) is obtained as a water-based dispersion of resin particles (C1) each having a structure composed of (A) adhering to the surfaces of (B) by dispersing the resin (b) or it solvent solution in the water-based dispersion of the resin particles (A) comprising the resin (a) and forming the resin particles (B) comprising the resin (b) in the water-based dispersion of (A).

Also, the water-based resin dispersion (X1) is obtained as a water-based dispersion of resin particles (C1) each having a structure composed of (A) adhering to the surfaces of (B) by dispersing the resin precursor (b0) of the resin (b) or it solvent solution in the water-based dispersion of the resin particles (A) comprising the resin (a), causing reaction of (b0), and forming the resin particles (B) comprising the resin (b) in the water-based dispersion of (A).

In the case of dispersing the resin (b) or its solvent solution, alternatively the precursor (b0) of the resin (b) or its solvent solution, a dispersing apparatus may be used.

The dispersing apparatus to be used in the invention is not particularly limited if it is commonly commercialized as an emulsifier or a disperser and examples usable as the apparatus are a batch type emulsifier such as a Homogenizer (manufactured by IKA), Polytron (manufactured by Kinematica), and TK Auto-Homo-Mixer (manufactured by Tokushu Kika Kogyo Co., Ltd.); a continuous type emulsifier such as Ebara Milder (manufactured by Ebara Corp.), TK Filmix, TK Pipeline Homomixer (manufactured by Tokushu Kika Kogyo Co., Ltd.), Colloid Mill (manufactured by Shinko Pantec Co., Ltd.), Slasher, Trigonal wet pulverizer (manufactured by Mitsui-Miike Kakoki), Capitron (manufactured by Eurotec), and Fine Flow Mill (manufactured by Taiheiyo Kiko); a high pressure emulsifier such as Micro Fluidizer (manufactured by Mizuho Kogyo), Nanomizer (manufactured by Nanomizer), and APV Goulin (manufactured by Goulin); a film emulsifier such as Film Emulsifier (manufactured by Reika Kogyo); a vibration type emulsifier such as Vibromixer (manufactured by Reika Kogyo); and an ultrasonic emulsifier such as Ultrasonic Homogenizer (Branson). Preferable apparatuses among them in terms of the evenness of the particle diameter are APV Goulin, Homogenizer, TK Auto Homomixer, Ebara Milder, TK Filmix, and TK Pipeline Homomixer.

At the time of dispersing the resin (b) in the water-based dispersion (W) of resin particles (A), the resin (b) is preferable to be a liquid. If the resin (b) is solid at a normal temperature, the resin may be dispersed in a liquid phase at a high temperature equal to or higher than the melting point or a solvent solution of (b) may be used.

The viscosity of the resin (b) or its solvent solution, alternatively the precursor (b0) of the resin or its solvent solution is generally 10 to 50,000 mPa·s (measured by B type viscometer) and preferably 100 to 10,000 mPa·s in terms of the evenness of the particle diameter.

The temperature at the time of dispersion is generally 0 to 150° C. (under pressure) and preferably 5 to 98° C. In the case the viscosity of the dispersion is high, it is preferable to carry out emulsification and dispersion after the viscosity is lowered to the above-mentioned preferable range by heating to a high temperature.

In the case of using a solvent solution of the resin (b) or the precursor (b0), the solvent to be used is not particularly limited if it can dissolve the resin (b) therein at a normal temperature or under heating. Practically, the same solvents as those exemplified as the solvent (u) may be employed. Although it depends on the type of the resin (b), preferable examples are those which give the sp value difference from that of the resin (b) 3 or lower. In terms of the particle diameter evenness of the resin particles (C), it is preferable for the solvent to dissolve the resin (b) therein but to be difficult to dissolve or swell the resin particles (A) comprising the resin (a).

The precursor (b0) of the resin (b) is not particularly limited if it becomes the resin (b) by chemical reaction and in the case the resin (b) is a vinyl resin, (b0) may be the above-mentioned vinyl monomers (possible to be used alone or in form of a mixture) and their solvent solution and in the case the resin (b) is a condensed type resin (e.g., polyurethane resins, epoxy resins, and polyester resins), (b0) may be a combination of a prepolymers ($\alpha$) having a reactive group and a curing agent ($\beta$) and In the case vinyl monomers are used as the precursor (b0), a method of causing the precursor (b0) to reaction to become the resin (b) may be a method of dispersing and suspending an oil phase containing an oil-soluble initiator, the monomers, and if necessary the solvent (u) in water in the presence of the water-soluble polymer (t) and carrying out radical polymerization reaction by heating (so-called suspension polymerization method) and a method of emulsifying an oil phase containing the monomers, and if necessary the solvent (u) in a water-based dispersion of the resin particles (A) containing an emulsifier (examples are same as those exemplified for the surfactant (s)) and a water-soluble initiator and then carrying out radical polymerization reaction by heating (so-called emulsion polymerization-method).

Peroxide polymerization initiator (I), azo polymerization initiator (II) may be used as the oil-soluble and water-soluble polymerization initiators. Further, redox type polymerization initiator (III) may be produced by combination use of peroxide polymerization initiator (I) and reducing agent. And two or more of (I) to (III) may be used in combination.

(I) Peroxide Polymerization Initiator (I-1) Oil-soluble peroxide polymerization initiators: acetylcyclohexylsulfonyl peroxide, isobutyryl peroxide, diisopropyl peroxydicarbonate, di-2-ethylhexyl peroxydicarbonate, 2,4-dichlorobenzoyl peroxide, tert-butyl peroxypivalate, octanoyl peroxide, lauroyl peroxide, propionyl peroxide, succinic acid peroxide, acetyl peroxide, tert-butyl peroxy-2-ethylhexanoate, benzoyl peroxide, p-chlorobenzoyl peroxide, tert-butyl peroxyisobutyrate, tert-butyl peroxymaleic acid, tert-butyl peroxylaurate, cyclohexanone peroxide, tert-butyl peroxyisopropylcarbonate, tert-butyl peroxyacetate, tert-butyl peroxybenzoate, diisobutyl diperoxyphthalate, methyl ethyl ketone peroxide, dicumyl peroxide, tert-butylcumyl peroxide, tert-butyl hydroperoxide, di-tert-butyl peroxide, diisopropylbenzene hydroperoxide, p-methane hydroperoxide, 2,5-dimethylhexane-2,5-dihydroperoxide, and cumene peroxide.

(I-2) Water-soluble peroxide polymerization initiators: hydrogen peroxide, peracetic acid, ammonium persulfate, and sodium persulfate.

(II) Azo Polymerization Initiator (II-1) Oil-soluble azo polymerization initiator: 2,2'-azobisisobutyronitrile, 1,1'-azobiscyclohexane-1-carbonitrile, 2,2'-azobis(4-methoxy-2,4-dimethylvaleronitrile), 2,2'-azobis(2,4-dimethylvaleronitrile), dimethyl-2,2'-azobis(2-methylpropionate), 1,1'-azobis(1-acetoxy-1-phenylethane), and 2,2'-azobis(4-methoxy-2,4-dimethylvaleronitrile).

(II-2) Water-soluble azo polymerization initiator: azobisamidinopropane salt, azobiscyanovaleric acid (salt), and 2,2'-azobis[2-methyl-N-(2-hydroxyethyl)propionamide]

(III) Redox Polymerization Initiator (III-1) non-aqueous redox polymerization initiator: combination use of oil-soluble peroxides such as hydroperoxide, dialkyl peroxide, and diacyl peroxide and oil-soluble reducing agents such as tertiaryamines, naphthenicacidsalts, mercaptans, organometal compounds (e.g., triethylaluminum, triethylboron, and diethylzinc)

(III-2) water-based redox polymerization initiator: combination use of water-soluble peroxides such as persulfates, hydrogen peroxide, hydroperoxides and water-soluble inorganic or organic reducing agents (e.g., ferrous salts, sodium hydrogen sulfite, alcohols, and polyamines).

As the precursor (b0), a combination of the reactive group-containing prepolymers ($\alpha$) and the curing agent ($\beta$) may be employed. Herein, "reactive group" means a group reactive with the curing agent ($\beta$). In this case, a method for forming the resin (b) by causing reaction of the precursor (b0) may include a method of dispersing an oil phase containing the reactive group-containing prepolymers ($\alpha$), the curing agent ($\beta$), and if necessary the solvent (u) in the water-based dispersion of the resin particles (A), causing reaction of the reactive group-containing prepolymers ($\alpha$) and the curing agent ($\beta$), and thereby forming the resin particles (B) comprising the resin (b); a method of dispersing the reactive group-containing prepolymers ($\alpha$) or its solvent solution in the water-based dispersion of the resin particles (A), adding the water-soluble curing agent ($\beta$) to the mixture, causing reaction, and thereby forming the resin particles (B) comprising the resin (b); and in the case the reactive group-containing prepolymers ($\alpha$) is cured by reaction with water, a method of dispersing the reactive group-containing prepolymers ($\alpha$) or its solvent solution in the water-based dispersion of the resin particles (A), causing reaction with water, and thereby forming the resin particles (B) comprising the resin (b).

Combinations of reactive groups of the reactive group-containing prepolymers ($\alpha$) and the curing agent ($\beta$) may include the following [1] and [2].

[1]: A combination of a functional group ($\alpha$1) reactive with an active hydrogen compound as the reactive group of the reactive group-containing prepolymers ($\alpha$) and an active hydrogen-containing compound ($\beta$1) as the curing agent ($\beta$)

[2]: A combination of an active hydrogen-containing group ($\alpha$2) as the reactive group of the reactive group-containing prepolymers ($\alpha$) and a compound ($\beta$2) reactive with the active hydrogen-containing group as the curing agent ($\beta$).

In terms of the reaction ratio in water, [1] is more preferable between them.

In the combination [1], functional group ($\alpha$1) reactive with an active hydrogen compound may include an isocyanate group ($\alpha$1a), a blocked isocyanate group ($\alpha$1b), an epoxy group ($\alpha$1c), an acid anhydride group ($\alpha$1d), and a acid halide group ($\alpha$1e). Preferable examples among them are ($\alpha$1a), ($\alpha$1b), and ($\alpha$1c) and particularly preferable examples are ($\alpha$1a) and ($\alpha$1b).

The blocked isocyanate ($\alpha$1b) means isocyanate blocked by a blocking agent.

The above-mentioned blocking agent may include oximes [e.g., acetoxime, methylisobutyl ketoxime, diethyl ketoxime, cyclopentanone oxime, cyclohexanone oxime, and methyl ethyl ketoxime]; lactams [e.g., $\gamma$-butyrolactam, $\epsilon$-caprolactam, and $\gamma$-valerolactam]; aliphatic alcohols having 1 to 20 carbon atoms [e.g., ethanol, methanol, and octanol]; phenols [e.g., phenol, m-cresol, xylenol, and nonylphenol]; active methylene compounds [e.g., acetylacetone, ethyl malonate, and ethyl acetoacetate]; basic nitrogen-containing compound [e.g., N,N-diethylhydroxylamine, 2-hydroxypyridine, pyridine N-oxide, and 2-mercaptopyridine]; and mixtures of two or more of the above exemplified compounds.

Oximes are preferable among them and methyl ethyl ketoxime is particularly preferable.

The skeleton structure of the reactive group-containing prepolymers ($\alpha$) may be polyethers ($\alpha$w), polyesters ($\alpha$x), epoxy resins ($\alpha$y), and polyurethanes ($\alpha$z). ($\alpha$x), ($\alpha$y), and ($\alpha$z) are preferable among them and ($\alpha$x) and ($\alpha$z) are particularly preferable.

Examples of the polyethers ($\alpha$w) are polyethylene oxide, polypropylene oxide, polybutylene oxide, and polytetramethylene oxide.

Examples of the polyesters ($\alpha$x) are condensation polymerization products of diols (11) and dicarboxylic acids (13) and polylactone (ring-opening polymers of $\epsilon$-caprolactone).

Examples of the epoxy resins ($\alpha$y) are addition condensation products of bisphenols [e.g., bisphenol A, bisphenol F, and bisphenol S] and epichlorohydrin.

Examples of the polyurethanes ($\alpha$z) are addition polymerization products of diols (11) and polyisocyanates (15) and addition polymerization products of polyesters ($\alpha$x) and polyisocyanates (15).

A method for introducing a reactive group into the polyesters ($\alpha$x), epoxy resins ($\alpha$y), and polyurethanes ($\alpha$z) are as follows.

[1]: A method for leaving functional groups of a constituent component in terminals by using an excess amount of one constituent component among two or more constituent components.

[2]: A method for leaving functional groups of a constituent component in terminals by using an excess amount of one constituent component among two or more constituent components and causing reaction of the remaining functional groups with a compound having a functional group and a reactive group reactive with the remaining functional groups.

In the above-mentioned method [1], hydroxyl-containing polyester prepolymers, carboxyl-containing polyester prepolymers, acid halide-containing polyester prepolymers, hydroxyl-containing epoxy prepolymers, epoxy group-containing epoxy prepolymers, hydroxyl-containing polyurethane prepolymers, and isocyanato group-containing polyurethane prepolymers are obtained.

With respect to the ratio of the constituent components, in the case of the hydroxyl-containing polyester prepolymers, the ratio of a polyol (1) and a polycarboxylic acid (2) on the basis of the equivalent ratio [OH]/[COOH] of the hydroxyl [OH] and the carboxyl [COOH] is generally in a range of 2/1 to 1/1, preferably in a range of 1.5/1 to 1/1, and more preferably in a range of 1.3/1 to 1.02/1. Also in the case of other skeleton structures and prepolymers having different terminal groups, the ratio is same although the constituent components are changed.

In the above-mentioned method [2], polyisocyanate is reacted on the prepolymers obtained by the above-mentioned method [1] to obtain isocyanate-containing prepolymers: blocked polyisocyanate is reacted to obtain blocked isocyanate group-containing prepolymers: polyepoxide is reacted to obtain epoxy group-containing prepolymers: and polyacid anhydride is reacted to obtain acid anhydride group-containing prepolymers.

With respect to the use amount of the compounds having a functional group and a reactive group, in the case polyisocyanate is reacted with the hydroxyl-containing polyesters to obtain the isocyanato group-containing polyester prepolymers, the ratio of the polyisocyanate and a hydroxyl-containing polyester on the basis of the equivalent ratio [NCO]/[OH] of the isocyanate group [NCO] and hydroxyl [OH] of the hydroxyl-containing polyester is generally in a range of 5/1 to 1/1, preferably in a range of 4/1 to 1.2/1, and more preferably in a range of 2.5/1 to 1.5/1. Also in the case of other skeleton structures and prepolymers having different terminal groups, the ratio is same although the constituent components are changed.

The reactive groups contained in one molecule of the reactive group-containing prepolymers (α) is generally one or higher, more preferably 1.5 to 3, and more preferably 1.8 to 2.5 in average. The molecular weight of a cured product to be obtained by reaction with the curing agent (β) is increased by adjusting it in the above-mentioned range.

The Mn of the reactive group-containing prepolymers (α) is generally 500 to 30,000, preferably 1,000 to 20,000, and more preferably 2,000 to 10,000.

The weight average molecular weight of the reactive group-containing prepolymers (α) is 1,000 to 50,000, preferably 2,000 to 40,000, and more preferably 4,000 to 20,000.

The viscosity of the reactive group-containing prepolymers (α) at 100° C. is generally 2000 poise or lower and preferably 1,000 poise or lower. It is preferable to adjust the viscosity to be 2,000 poise or lower since the resin particles (C) with a sharp particle size distribution with a small amount of the solvent can be obtained.

The active hydrogen group-containing compound (β1) may include polyamines (β1a) optically blocked with dissociable compounds, polyols (β1b), polymercaptans (β1c), and water (β1d). (β1a), (β1b) and (β1d) are preferable among them and (β1a) and (β1d) are more preferable and blocked polyamines and (β1d) are even more preferable.

Examples of (β1a) are same as those exemplified as the polyamines (16). Preferable examples of (β1a) are 4,4'-diaminophenylmethane, xylylenediamine, isophoronediamine, ethylenediamine, diethylenetriamine, triethylenetetramine and their mixtures.

Examples of (β1a) in the case (β1a) denote polyamines blocked with dissociable compounds are ketimines obtained from the above-mentioned polyamines and ketones having 3 to 8 carbon atoms (e.g., acetone, methyl ethyl ketone, and methyl isobutyl ketone); and aldimine compounds obtained from aldehyde compounds having 2 to 8 carbon atoms (e.g., formaldehyde and acetaldehyde), enamine compounds, and oxazolidone compounds.

Examples of polyols (β1b) are same as those exemplified above as diols (11) and polyols (12). Diols (11) alone or mixtures of diols (11) and slight amounts of polyols (12) are preferable.

Examples of polymercaptans (β1c) are ethylenedithiol, 1,4-butanedithiol, and 1,6-hexanedithiol.

If necessary, a reaction stopping agent (βs) may be used in combination with the active hydrogen group-containing compound (β1). Use of the reaction stopping agent (β1) in combination at a certain constant ratio makes it possible to adjust (b) to have a prescribed molecular weight.

Examples of the reaction stopping agent (βs) are monoamines (e.g., diethylamine, dibutylamine, butylamine, laurylamine, monoethanolamine, and diethanolamine); blocked monoamines (e.g., ketimine compounds); monool (e.g., methanol, ethanol, isopropanol, butanol, and phenol); monomercaptans (e.g., butylmercaptan and laurylmercaptan); monoisocyanates (lauryl isocyanate and phenyl isocyanate); and monoepoxides (e.g., butyl glycidyl ether).

The active hydrogen-containing groups (α2) of the reactive group-containing prepolymers (α) in the above-mentioned combination [2] may include amino groups (α2a), hydroxyl groups (alcohol type hydroxyl group and phenolic type hydroxyl group) (α2b), mercapto groups (α2c), carboxyl groups (α2d), and organic groups (α2e) blocked with dissociable compounds. The compounds (α2a), (α2b) and organic groups (α2e) with amino group blocked by dissociable compounds are preferable among them and (α2b) are particularly preferable.

The organic groups with amino group blocked by dissociable compounds are those same as the compounds exemplified for the above-mentioned (β1a).

Examples of compounds (β2) reactive with the active hydrogen-containing groups are polyisocyanates (β2a), polyepoxides (β2b), polycarboxylic acids (β2c), polyacid anhydrides (β2d), and polyacid halides (β2e). Preferable compounds among them are (β2a) and (β2b) and more preferable compounds are (β2a).

Examples of the polyisocyanates (β2a) are same as those exemplified as the polyisocyanates (15) and preferable ones are also same.

Examples of the polyepoxides (β2b) are same as those exemplified as the polyepoxides (18) and preferable ones are also same.

Examples of the polycarboxylic acids (β2c) are dicarboxylic acids (β2c-1) and tri- or higher valent polycarboxylic acids (β2c-2) and (β2c-1) alone and mixtures of (β2c-1) and small amounts of (β2c-2) are preferable.

Examples of the dicarboxylic acids (β2c-1) are same as the above-mentioned dicarboxylic acids (13) and polycarboxylic acids are same as the above-mentioned polycarboxylic acids (5) and preferable ones are also same.

Examples of polycarboxylic anhydrides (β2d) may include pyromellitic acid anhydride.

Examples of the polyacid halides (β2e) are the acid halides of the above-mentioned (β2c) (e.g., acid chloride, acid bromide, and acid iodide).

Further, based on the necessity, the reaction stopping agent (βs) may be used in combination with (β2).

The ratio of the curing agent (β) on the basis of the equivalent ratio [α]/[β] of the equivalent amount [α] of the reactive groups in the reactive group-containing prepolymers (α) and that of the active hydrogen-containing groups [β] of the curing agent (β) is preferably in a range from 1/2 to 2/1, more preferably in a range from 1.5/1 to 1/1.5, and even more preferably in a range from 1.2/1 to 1/1.2. In the case the curing agent (β) is water (β1d), water is regarded as a divalent active hydrogen compound.

The resin (b) obtained by reaction of the precursor (b0) comprising the reactive group-containing prepolymers (α) and the curing agent (β) in the water-based solvent becomes a constituent component for the resin particles (B) and the resin particles (C). The weight average molecular weight of the resin (b) formed by reaction of the reactive group-containing prepolymers (α) and the curing agent (β) is generally 3,000 or higher, preferably 3,000 to 10,000,000, and more preferably 5,000 to 1,000,000.

At the time of reaction of the reactive group-containing prepolymers (α) and the curing agent (β) in the water-based solvent, it is allowed to add a polymer (so-called dead polymer) which does not react with the reactive group-containing prepolymers (α) and the curing agent (β). In this case, (b) becomes a mixture of the resin obtained by reaction of the reactive group-containing prepolymers (α) and the curing agent (β) in the water-based solvent and the resin which is not reacted.

The use amount of the water-based solvent (W) to 100 parts of the resin (b) or the precursor (b0) is preferably in a range of 50 to 2,000 parts by weight and more preferably in a range of 100 to 1,000 parts by weight. If it is 50 parts by weight or more, the dispersion state of (b) is good and if it is 2,000 parts by weight or less, it is economical.

In the inventions, use of the resins (a) and (b) satisfying that the point (K, H) is within the specified range in the second invention or use of the resin (a) having the physical properties such as (Ts) and (Tg) of the third invention, for example, particularly in the case of using a solvent (particularly the following preferable solvents) solution of (b) or (b0), makes it possible to dissolve the resin particles (A) in the solvent and form a film-like shape and to obtain the water-based dispersion (X2) of the resin particles (C21) comprising (B) bearing coating of (A) in many cases only by using the solvent for the water-based resin dispersion (X1) at a ratio preferably in a range of 10 to 50% (more preferably in a range of 20 to 40%) and then desolvating the solvent of the water-based resin dispersion (X1) to 1% or lower (particularly 0.5% or lower) at 40° C. or lower. However, in the case the coating of (A) is not formed, or even in the case a coating is formed using at least a portion of (A), if the following process is carried out to make the smoothness of the coating on the surfaces of the resin particles (C) better, the water-based resin dispersion (X2) of the resin particles (C21) each comprising the core layer (Q) composed of (B) and a surface-smoothed coating [the shell layer (P)] of (A) on at least a portion or preferably on the entire face of the surface of the core layer (Q) can be obtained and (C21) to be obtained from the dispersion are excellent in the storage stability and therefore, it is preferable.

The above-mentioned method may include a method of dissolving (A) adhering to (B) in a solvent and a method of heating the water-based resin dispersion (X1) and thereby melting (A) and forming a film and these methods may be combined.

The solvent to be used for dissolving the resin particles (A) therein and forming a film may be added to (X1) at the time of film formation, however it is preferable that the solvent solution of the resin (b) or the precursor (b0) is used as a raw material of (X1) and the solvent is not removed immediately after formation of the resin particles (B) to thereby make use of the solvent for the purpose since the solvent is contained in (B) and dissolution of (A) is therefore easy and agglomeration of the resin preferably becomes difficult.

Those having high affinity to (b) are preferable as the solvent and practical examples are same as those exemplified as the above-mentioned solvents (u). Preferable examples among (u) are tetrahydrofuran, toluene, acetone, methyl ethyl ketone and ethyl acetate and more preferably ethyl acetate in terms of film formation.

The solvent concentration in the water-based resin dispersion at the time of dissolving (A) in the solvent is preferably in a range of 3 to 60%, more preferably in a range of 10 to 45%, and even more preferably in a range of 15 to 30%. The dissolution is carried out by stirring the water-based resin dispersion for, for example, 1 to 10 hours and the temperature at the time of dissolution is preferably in a range of 15 to 45° C. and more preferably in a range of 15 to 30° C.

In the case the film is formed on the surfaces of (B) by melting (A), the content [the content of the components other than water and the solvent] of the solid matter in the water-based resin dispersion (X1) is adjusted to be preferably in a range of 1 to 50% and more preferably 5 to 30%. In this case, the content of the solvent is preferably 2% or less, more preferably 1% or less, and even more preferably 0.5% or less. If the solid matter content in (X1) is high or the solvent content exceeds 2%, agglomerates may possibly be formed if (X1) is heated to 60° C. or higher. The conditions of the heating at the time of melting are not particularly limited if they are suitable for melting (A), for example, a method of heating preferably at 40 to 100° C., more preferably 60 to 90° C., and even more preferably 60 to 80° C. for preferably 1 to 300 minutes under stirring condition can be exemplified.

Additionally, a method of the treatment for film formation, a preferable heating treatment temperature in the case of obtaining the resin particles (C21) with smooth surfaces by heating the water-based dispersion (X1) of the resin particles (C1) with a solvent content of 2% or lower and thereby melting (A) on the core (Q) is preferably in a temperature range of Tg or higher of (P) and 80° C. or lower. If the heating treatment temperature is lower than Tg of (P), the surface smoothness of the resin particles (C21) is scarcely changed. If the heating treatment temperature is carried out at a temperature exceeding 80° C., the shell (P) may possibly be peeled off the core.

A preferable method between the methods of film formation of (A) is the method of melting (A) and combination of the method of dissolving (A) and the method of melting (A).

The resin particles (C1) are obtained by dispersing a resin (b), a solvent solution of (b), a precursor (b0) of the resin (b) or a solvent solution of (b0) in the water-based dispersion (W) of the resin particles (A) comprising the resin (a); further forming resin (b) by reaction of (b0) in the case of using (b0); thereby obtaining the water-based dispersion (X1) of the resin particles (C1) with a structure composed of the resin particles (B) comprising the resin (b) bearing the resin particles (A) on the surfaces thereof and/or the water-based resin dispersion (X2) of the resin particles (C2) with a structure composed of the resin particles (B) bearing the film formed by resin particles (A) on the surfaces thereof; and finally removing the water-based solvent from the water-based resin dispersion (X1) or (X2) [hereinafter, (X1) or (X2) are referred to as (X) in some cases]. Examples of the method for removing the water-based solvent from the water-based dispersion are the same as exemplified for the methods for removing the water-based solvent from the water-based dispersion of (C2) in accordance with the production method for the resin particles of the first invention.

The resin particles (C1) are practically composed of relatively small resin particles (A) and relatively large resin particles (B) and exist in form of (B) bearing (A) on the surfaces. The resin particles (C21) are particles obtained by attaching (A) to (B), dissolving and/or melting them, and thereby forming film made from (A) on the surfaces of (B).

In the case the attraction power of both particles is to be increased, it is effective to give mutually opposed electric charge to (A) and (B); to use a surfactant (s) or a water-soluble polymer (t) having opposed electric charged to that of (A) and (B) in the case both (A) and (B) have the same electric charge; or to lower the sp value difference of the resin (a) and the resin (b) as much as possible within the above-mentioned range (e.g. 2 or lower).

In terms of the particle diameter evenness and the storage stability of the resin particles (C), the resin particles (C) are composed of preferably 0.01 to 60% of (A) and 40 to 99.99% of (B); more preferably 0.1 to 50% of (A) and 50 to 99.9% of (B); and even more preferably 1 to 45% of (A) and 55 to 99% of (B).

In terms of the particle diameter evenness, the powder flowability, and the storage stability of the resin particles (C1), the resin particles (B) are covered with the resin particles (A) at a ratio of preferably 5% or higher, more preferably 30% or higher, further more preferably 50% or higher, and even more preferably 80% of the surface. The surface coverage of (C1) is calculated according to the following equation from the results of image analysis of an image obtained by a scanning electron microscope (SEM).

Surface coverage (%)=[surface area of portion covered with the resin particles (A)/surface area of portion covered with the resin particles (A)+exposed portion of the resin particles (B)]×100. In this connection the surface coverage of (C21) is same as (C2) of the first invention.

In terms of the particle diameter evenness, the coefficient of variation of the volume distribution of the resin particles (C) is preferably 30% or lower and more preferably 0.1 to 15%.

In terms of the particle diameter evenness, the value [volume average particle diameter/number average particle diameter] of the resin particles (C) is preferably 1.0 to 1.4 and more preferably 1.0 to 1.2.

The volume average particle diameter of (C) differs depending on uses, however it is generally preferable in the range from 0.1 to 300 μm. The upper limit is more preferably 250 μm and even more preferably 200 μm and the lower limit is more preferably 0.5 μm and even more preferably 1 μm.

The volume average particle diameter and the number average particle diameter can be measured simultaneously by Multisizer III (manufactured by Coulter).

The resin particles (C) of the invention may be provided with desired surface roughness by changing the particle diameters of the resin particles (A) and the resin particles (B), the surface coverage of the resin particles (B) with the resin particles (A), or the surface coverage of core layer (Q) with shell layer (P). In the case powder flowability is improved, the BET specific surface area of (C) is preferably 0.5 to 5.0 m²/g.

The BET specific surface area in the invention is measured (measurement gas: He/Kr=99.9/0.1 vol. %, calibration gas: nitrogen) by a specific surface area meter, for example, QUANTASORB (manufactured by Yuasa Ionics Corp.)

Similarly, in terms of the powder flowability, the centerline average surface roughness Ra of (C) is preferably 0.01 to 0.8 μm. Ra is a value calculated by arithmetically averaging the absolute values of the deviation of the roughness curve from the center line thereof and can be measured by, for example, a scanning type probe microscopic system (manufactured by Toyo Corp.).

The shape of the resin particles (C) is preferably spherical in terms of the powder flowability and melt leveling property. In that case, particles (A) and particles (B) are also preferable to be spherical. The average degree of circularity of (C) is preferably 0.95 to 1.00. The average degree of circularity is more preferably 0.96 to 1.0 and even more preferably 0.97 to 1.0. The average degree of circularity is a value calculated by optically detecting particles and dividing by the circumferential length of the corresponding circle having equivalent projected area. Practically, a flow type particle image analyzer (FPIA-2000; manufactured by Sysmex Corp.) is used for the measurement. A prescribed container is filled with 100 to 150 ml of water previously subjected to impurity solid matter removal and 0.1 to 0.5 ml of a surfactant (Dry Well: manufactured by Fuji Photo Film Co., Ltd.) as a dispersant is added and further 0.1 to 9.5 g of a sample to be measured is added. The suspension in which the sample is dispersed is treated by an ultrasonic disperser (Ultrasonic Cleaner Model VS-150: manufactured by Velvo-Clear) for about 1 to 3 minutes for dispersion to adjust the dispersion concentration of 3,000 to 10,000 μL and thus the shape and the distribution of a toner are measured.

In the second, third, fourth, eighth and tenth inventions, and in the production method (I) to obtain the resin particles of the first invention, the resin particles (C) of the invention may be provided with smooth surface or desired surface roughness by changing the particle diameter ratio of the resin particles (A) and the resin particles (B), the surface coverage of the resin particles (B) with the resin particles (A) in water-based resin dispersion (X1), or the depth in which the resin particles (A) buried in the resin particles (B) in the interface of the resin particles (B)/water-based solvent in water-based resin dispersion (X1).

The surface coverage of the resin particles (B) with the resin particles (A), or the depth in which the resin particles (A) buried in the resin particles (B) can be controlled by the following methods.

[1]: At the time of producing water-based resin dispersion (X1), if the resin particles (A) and the resin particles (B) are made to have mutually opposed electric charge, the surface coverage and the depth become high. If the electric charge of the resin particles (A) and the resin particles (B) are made higher, the surface coverage and the depth becomes higher.

[2]: At the time of producing water-based resin dispersion (X1), if both of the resin particles (A) and the resin particles (B) are made to have electric charge with the mutually same polarity (both are made positive or both are made negative), the surface coverage tends to be low and the depth tends to be shallow. In this case, generally if the surfactant (s) and/or the water-soluble polymer (t) [particularly having opposed electric charge to that of the resin particles (A) and the resin particles (B)] is used, the coverage is increased. Also, in the case the water-soluble polymer (t) is used, the depth becomes deeper as the molecular weight of the water-soluble polymer (t) is higher.

[3]: At the time of producing water-based resin dispersion (X1), if the resin (a) is a resin having an acidic functional group such as carboxyl, phosphoric acid group, and sulfonic acid group (generally it is preferable that the molecular weight per one acidic functional group is 1,000 or lower), the coverage and the depth become higher as the pH of the water-based solvent is lower. On the contrary, the coverage and the depth become smaller as the pH of the water-based solvent is higher.

[4]: At the time of producing water-based resin dispersion (X1), if the resin (a) is a resin having a basic functional group such as primary amino group, secondary amino group, tertiary amino group, and quaternary ammonium group (generally it is preferable that the molecular weight per one basic functional group is 1,000 or lower), the coverage and the depth become higher as the pH of the water-based solvent is higher. On the contrary, the coverage and the depth become smaller as the pH of the water-based solvent is lower.

[5]: The coverage and the depth become higher if the sp value difference of the resin particles (a) and the resin particles (b) is made narrower.

The resin particles (A) and/or (B) composing the resin particles (C) may contain additives (a pigment, a filler, an antistatic agent, a coloring agent, a releasing agent, a charge controlling agent, an ultraviolet absorbent, an antioxidant, an antiblocking agent, a thermal resistant stabilizer, and a flame retardant). As a method for adding the additives to (A) or (B), they may be added at the time of producing the water-based resin dispersion (X1) in the water-based solvent, however it is more preferable that the resin (a) or the resin (b) is previously mixed with the additives and then the mixture of them is added to the water-based solvent and disperse it in the solvent.

Further, in the invention, the additives are not necessarily added at the time of forming the particles in the water-based solvent, they may be added after formation of the particles. For example, after the particles containing no coloring agent are formed, a coloring agent may be added by a conventionally known dyeing method or the particles may be impregnated with the above-mentioned additives together with the solvent (u) and/or the plasticizer (v).

If the resin particles (A) contain a charge controlling agent containing the above-mentioned organic acid salt (m) as an additive, the electrostatic property is improved and it is therefore preferable.

As (m), those same as described above can be exemplified and the use amount is also same.

Generally in the inventions, particularly in the third invention, if a wax (c) and a modified wax (d) comprising grafting vinyl polymer chains are added in combination with the resin (b) in the resin particles (B), the thermal resistant storage stability is further improved and therefore it is preferable.

The content of (c) in (B) is preferably 20% or lower and more preferably in a range of 1 to 15%. The content of (d) is preferably 10% or lower and more preferably in a range of 0.5 to 8%. The total content of (c) and (d) is preferably 25% or lower and more preferably in a range of 1 to 20%.

The wax (c) is dispersed in the resin (b) after previously being melt-kneaded with the modified wax (d) in absence of a solvent and/or being thermally dissolved and mixed with the modified wax (d) in the presence of a solvent.

Examples usable as the wax (c) may include polyolefin waxes, paraffin waxes, carbonyl-containing waxes and their mixtures and particularly preferable waxes among them are paraffin wax (c1). Examples of (c1) are petroleum type waxes containing mainly linear saturated hydrocarbons having 20 to 36 carbon atoms and having a melting point in a range of 50 to 90° C.

In terms of the releasing property, Mn of (c) is preferably 400 to 5000, more preferably 1000 to 3000, and even more preferably 1500 to 2000. In the above-mentioned description and hereinafter, Mn of the wax is measured by GPC (solvent: o-dichlorobenzene, standard substance: polystyrene).

The wax (c) is preferable to be dispersed in the resin (b) after previously being melt-kneaded in absence of a solvent and/or being thermally dissolved and mixed with the modified wax (d) comprising grafting vinyl polymer chains in the presence of a solvent (u). By this method, at the time of wax dispersion, coexistence of the modified wax (d) makes it possible to adsorb the wax moiety of (d) in the surface of (c) or partially entangle of the modified wax (d) in the matrix structure of the wax and the wax (c) surface and the resin (b) become mutually affinitive and (c) can be included more evenly in the resin particles (B) and thus control of the dispersion state is made easy.

The modified wax (d) comprises a wax grafted with vinyl polymer chains. Examples to be used as wax for (d) are those same as exemplified for the above-mentioned wax (c) and preferable examples are also same. The vinyl monomers composing the vinyl polymer chains of (d) are same as the exemplified monomers (1) to (10) composing the above-mentioned vinyl resins and particularly preferable monomers among them are monomers (1), (2), and (6). The vinyl polymer chains may be homopolymers and copolymers of the vinyl monomers.

The amount of the wax component (including un-reacted wax) in the modified wax (d) is preferably 0.5 to 99.5%, more preferably 1 to 80%, furthermore preferably 5 to 50%, and even more preferably 10 to 30%. Tg of (d) is preferably 40 to 90° C. and more preferably 50 to 80° C. in terms of the thermal resistant storage stability of the resin particles (C).

Mn of (d) is preferably 1500 to 10000 and more preferably 1800 to 9000. If Mn is in a range of 1500 to 10000, the mechanical strength of the resin particles (C) is high.

The modified wax (d) is obtained by dissolving or dispersing the wax (c) in a solvent (e.g., toluene or xylene), heating the wax at 100 to 200° C., dropwise adding vinyl monomers with a peroxide type initiator (e.g., benzoyl peroxide, di-tert-butyl peroxide, and tert-butyl peroxide benzoate), polymerizing the monomers, and then removing the solvent.

The amount of the peroxide type initiator in the synthesis of the modified wax (d) is preferably 0.2 to 10% and more preferably 0.5 to 5% on the basis of the total weight of the raw materials of (d).

Oil-soluble polymerization initiators and water-soluble polymerization initiators may be used as peroxide polymerization initiator.

Practical examples of the initiators may include those mentioned above.

A method for mixing the wax (c) and the modified-wax (d) may include [1] a method of melting and kneading them at a temperature equal to or higher than their melting points; [2] a method of dissolving or suspending (c) and (d) in the solvent (u), precipitating in the solution by cooling crystallization or solvent crystallization or deposition in a gas by spray drying; and [3] a method of dissolving or suspending (c) and (d) in the solvent (u) and mechanically wet-pulverizing them by a dispersing apparatus. The method [2] is preferable among them.

A method of dispersing the wax (c) and the modified wax (d) in (b) may be a method of obtaining respective solvent solutions or dispersions of (c) and (d) in (b) and mixing them.

EXAMPLES

Hereinafter, the inventions will be described more in detail with reference to examples, however it is not intended that the inventions be limited to the illustrated examples. In the following description, "part" denotes part by weight without otherwise specified.

Production Example 1

Production of Water-Based Dispersion of Resin Particle (A)

At first, 130 parts of isopropanol was loaded into a reaction container equipped with a stirrer and a thermometer and in stirring condition, a mixed solution containing 80 parts of styrene, 85 parts of methacrylic acid, 120 parts of butyl acrylate, and 62 parts of benzoyl peroxide (containing 25% of water) was dropwise added for 120 minutes. Further, in stirring condition, 50 parts of the obtained polymerization solution was dropwise added to 60 parts of ion water to obtain a water-based dispersion [fine particle dispersion W1]. The volume average particle diameters of [fine particle dispersion W1] measured by LA-920 and ELS-800 were both 0.09 µm. A portion of [fine particle dispersion W1] was dried to isolate a resin component. The Tg of the resin component measured by DSC was 72° C. and the initial softening temperature was 98° C., and the flow temperature was 175° C.

Production Example 2

Production of Water-Based Dispersion of Resin Particle (A)

A reaction vessel equipped with a condenser tube, a stirrer, and a nitrogen introduction pipe was filled with 377 parts of 1,2-propylene glycol (hereinafter, referred to as propylene glycol), 350 parts of dimethyl terephthalate, 40 parts of adipic acid, and as a condensation catalyst 0.3 parts of tetrabutoxytitanate and reaction of the mixture was carried out at 180° C. for 8 hours under nitrogen flowing condition while produced methanol was being removed. Next, while the reaction product was gradually heated to 230° C., the reaction was carried out further for 4 hours under nitrogen flowing condition while produced propylene glycol and water were being removed and further reaction was continued under reduced pressure of 5 to 20 mmHg and at the moment the value 1000 Pa·s measured by a flow tester was read at 85° C., the reaction product was taken out. After the taken out resin was cooled to a room temperature, it was pulverized and granulated to obtain [polyester b0]. Mw of [polyester b0] was 3200. Next, 30 parts of acetone was added to 30 parts of [polyester b0] and further 2.5 parts of triethylamine was added. Further, 90 parts of water was added to the obtained solution which was well stirred to obtain a water-based dispersion of polyester resin [fine particle dispersion W2]. The volume average particle diameter of [fine particle dispersion W2] measured by ELS-800 was 0.05 µm. A portion of [fine particle dispersion W2] was dried and resin component was isolated and the glass transition temperature, the initial softening temperature, and the flow temperature of the obtained resin component measured by a flow tester were 60° C., 90° C., and 155° C., respectively.

Production Example 3

Production of Water-Based Dispersion of Resin Particle (A)

A reaction container equipped with a stirrer and a thermometer was filled with 753 parts of water, 8 parts of alkylallylsulfosuccinic acid sodium salt (Eleminol JS-2, manufactured by Sanyo Chemical Industries, Ltd.), 58 parts of styrene, 58 parts of methacrylic acid, 77 parts of butylacrylate, 1 part of ammonium persulfate, and 9 parts of a surfactant (polyoxysorbitan monooleate) and the mixture was stirred at 400 rpm for 15 minutes to obtain a white emulsion. The emulsion was heated to 75° C. inner temperature and reaction was carried out for 5 hours. Further, 30 parts of an aqueous 1% ammonium persulfate solution was added and the reaction mixture was aged at 75° C. for 5 hours to obtain a water-based dispersion of vinyl resin (styrene-methacrylic acid-butyl acrylate-sodium alkylallylsulfosuccinate copolymer) [fine particle dispersion W3]. The volume average particle diameters of [fine particle dispersion W3] measured by LA-920 and ELS-800 were both 0.05 µm. A portion of [fine particle dispersion W3] was dried and resin component was isolated and the Tg, the initial softening temperature, and the flow temperature of the obtained resin component measured by DSC were 60° C., 110° C., and 198° C., respectively.

Production Example 4

Production of Water-Based Dispersion of Resin Particle (A)

At first, 132 parts of isopropanol was loaded into a reaction container equipped with a stirrer and a thermometer and in stirring condition, a mixed solution containing 82 parts of styrene, 82 parts of methacrylic acid, 109 parts of butyl acrylate, and 60 parts of benzoyl peroxide (containing 25% of water) was dropwise added for 120 minutes. Further, in stirring condition, 50 parts of the obtained polymerization solution was dropwise added to 60 parts of ion water to obtain a water-based dispersion [fine particle dispersion W4]. The volume average particle diameters of [fine particle dispersion W4] measured by LA-920 and ELS-800 were both 0.10 µm. A portion of [fine particle dispersion W4] was dried and resin component was isolated and the Tg, the initial softening temperature, and the flow temperature of the obtained resin component measured by DSC were 75° C., 100° C., and 160° C., respectively.

Production Example 5

Production of Water-Based Dispersion of Resin Particle (A)

At first, 150 parts of isopropanol was loaded into a reaction container equipped with a stirrer and a thermometer and in stirring condition, a mixed solution containing 91 parts of styrene, 91 parts of methacrylic acid, 122 parts of butyl acrylate, and 1.0 part of benzoyl peroxide (containing 25% of water) was dropwise added for 120 minutes. Further, in stirring condition, 50 parts of the obtained polymerization solution was dropwise added to 60 parts of ion water to obtain a water-based dispersion [fine particle dispersion W5]. The volume average particle diameters of [fine particle dispersion W5] measured by LA-920 and ELS-800 were both 0.10 μm. A portion of [fine particle dispersion W5] was dried and resin component was isolated and the Tg, the initial softening temperature, and the flow temperature of the obtained resin component measured by DSC were 95° C., 120° C., and 225° C., respectively.

Production Example 6

Production of Water-Based Dispersion of Resin Particle (A)

A water-based dispersion of vinyl resin (styrene-butyl acrylate-methacrylic acid-Zn methacrylate-sodium alkylallylsulfosuccinate copolymer) [fine particle dispersion W6] was obtained in the same production manner as the Production Example 3, except that 58 parts of methacrylic acid was changed to 38 parts of methacrylic acid and 20 parts of Zn methacrylate. The volume average particle diameters of the fine particle dispersion measured by LA-920 and ELS-800 were both 0.08 μm. A portion of [fine particle dispersion W6] was dried and resin component was isolated and the Tg of the obtained resin component measured by DSC was 72° C.

Production Example 7

Production of Resin (b)

[Synthesis of Linear Polyester]

At first, 701 parts (18.8 mole) of propylene glycol, 716 parts (7.5 mole) of terephthalic acid dimethyl ester, 180 parts (2.5 mole) of adipic acid, and as a condensation catalyst, 3 parts of tetrabutoxy titanate were loaded into a reaction vessel equipped with a condenser tube, a stirrer, and a nitrogen introduction tube and under nitrogen flow, while produced methanol are removed, reaction was carried out for 8 hours. Successively, while the temperature was gradually heated to 230° C. and produced propylene glycol and water was being removed under nitrogen flow, reaction was carried out for 4 hours and further reaction was continued in reduced pressure of 5 to 20 mmHg and when the softening point reached 150° C., the reaction product was taken out. The recovered propylene glycol was 316 parts (8.5 mole). After the taken out resin was cooled to a room temperature, the resin was pulverized and granulated to obtain [polyester b]. Mn of [polyester b] was 8000.

The number of mole in the parenthesis ( ) means the relative mole ratio, hereinafter the same.

Production Example 8

Production of Resin (b)

[Synthesis of Non-Linear Polyester]

At first, 557 parts (17.5 mole) of propylene glycol, 569 parts (7.0 mole) of terephthalic acid dimethyl ester, 184 parts (3.0 mole) of adipic acid, and as a condensation catalyst, 3 parts of tetrabutoxy titanate were loaded into a reaction vessel equipped with a condenser tube, a stirrer, and a nitrogen introduction tube and under nitrogen flow, while produced methanol are removed, reaction was carried out for 8 hours. Successively, while the temperature was gradually heated to 230° C. and produced propylene glycol and water was being removed under nitrogen flow, reaction was carried out for 4 hours and further continued for 1 hour in reduced pressure of 5 to 20 mmHg. The recovered propylene glycol was 175 parts (5.5 mole). After the reaction system was cooled to 180° C. and 121 parts (1.5 mole) of trimellitic anhydride was added and reaction was carried out for 2 hours at normal pressure in closed state and further continued at 220° C. and normal pressure and when the softening point reached 180° C., the product was taken out and cooled to a room temperature and pulverized and granulated to obtain [polyester b2]. Mn of [polyester b2] was 8500.

Production Example 9

At first, 2000 parts of polycaprolactonediol (Placcel L 220AL, manufactured by Dicel Chemical Industry, Ltd.) having a hydroxyl value of 56 was loaded into a reaction container equipped with a stirrer and a thermometer and heated to 110° C. for dehydration at a reduced pressure of 3 mmHg for 1 hour. Successively, 457 parts of IPDI was added and reaction was carried out at 110° C. for 10 hours to obtain [urethane prepolymer 1] having isocyanate groups at terminals. The NCO content of [urethane prepolymer 1] was 3.6%.

Production Example 10

A reaction container equipped with a stirrer and a thermometer was filled with 50 parts of ethylenediamine and 300 parts of MIBK and reaction was carried out at 50° C. for 5 hours to obtain a ketimine compound [curing agent 1].

Production Example 11

Production of Resin (b)

At first, 452 parts of xylene was loaded into an autoclave reaction vessel equipped with a thermometer, a stirrer, and a nitrogen introduction tube and after replacement with nitrogen, a mixture of a monomer mixture containing 845 parts of styrene and 155 parts of n-butyl acrylate with as an initiator 6.4 parts of di-tert-butyl peroxide, and 125 parts of xylene was dropwise added at 170° C. for 3 hours. After the dropwise addition, the reaction mixture was aged at 170° C. for 1 hour to complete polymerization. After that, under a reduced pressure, desolvation was carried out to obtain a resin [vinyl resin b3]. The weight average molecular weight of [vinyl resin b3] by GPC was 14,000 and the glass transition temperature was 60° C.

Production Example 12

Production of Resin (b)

A reaction container equipped with a condenser tube, a stirrer, and a nitrogen introduction tube was filled with 343 parts of bisphenol A-2 mole EO adduct, 166 parts of isophthalic acid, and 2 parts of dibutyltin oxide and reaction of the mixture was carried out at 230° C. and normal pressure for 8 hours and further in reduced pressure of 10 to 15 mmHg for 5 hours and after that the reaction mixture was cooled to 110° C. and further reacted with 17 parts of isophorone diisocyanate in toluene at 110° C. for 5 hours and successively, desolvation was carried out to obtain a resin [urethane-modified polyester b4] with a weight average molecular weight of 72,000 and a NCO content of 0.7%.

Production Example 13

Production of Resin (b)

[Polyester b5] which was not modified and had Mn of 2,400, hydroxyl value of 51, and acid value of 5 was obtained in the same manner as Production Example 12, except that 570 parts of bisphenol A-2 mole EO adduct and 217 parts of terephthalic acid were used and condensation polymerization was carried out at 230° C. and normal pressure for 6 hours.

Production Example 14

Production of Colorant Dispersion

A beaker was filled with 20 parts of copper phthalocyanine, 4 parts of a colorant dispersant (Solsperse 28000, manufactured by Avecia KK), 20 parts of [polyester b2], and 56 parts of ethyl acetate and the mixture was evenly stirred and dispersed and then the copper phthalocyanine was micro-dispersed by Beads-mill to obtain [colorant dispersion 1]. The volume average particle diameter of the [colorant dispersion 1] measured by LA-920 was 0.3 μm.

Production Example 15

Production of Colorant Dispersion

A beaker was filled with 20 parts of copper phthalocyanine, 4 parts of a colorant dispersant (Solsperse 28000, manufactured by Avecia KK), and 76 parts of ethyl acetate and the mixture was evenly stirred and dispersed and then the copper phthalocyanine was micro-dispersed by Beads-mill to obtain [colorant dispersion 2]. The volume average particle diameter of the [colorant dispersion 2] measured by LA-920 was 0.3 μm.

Production Example 16

Production of Modified Wax

At first, 454 parts of xylene and 150 parts of low molecular weight polyethylene (Sanwax LEL-400, manufactured by Sanyo Chemical Industries, Ltd.: softening point 128° C.) were loaded into an autoclave reaction vessel equipped with a thermometer and a stirrer and the inside gas was replace with nitrogen, the temperature was heated 170° C. to sufficiently dissolve these compounds and a mixed solution containing 595 parts of styrene, 255 parts of methyl methacrylate, 34 parts of di-tert-butyl peroxyhexahydroterephthalate, and 119 parts of xylene was dropwise added at 170° C. for 3 hours and polymerization was carried out and the reaction mixture was kept at the temperature for 30 minutes. Next, desolvation was carried out to obtain [modified wax 1]. The [modified wax] had an sp value of graft chains of 10.35 $(cal/cm^3)^{1/2}$, 1872 for Mn, 5194 for Mw, and 56.9° C. for Tg.

Production Example 17

Production of Wax Dispersion

At first, 10 parts of paraffin wax (melting point 73° C.), 1 part of [modified wax 1], and 33 parts of ethyl acetate were loaded into a reaction container equipped with a thermometer and a stirrer and heated 78° C. to sufficiently dissolve these compounds and cooled to 30° C. by taking 1 hour to crystallize the wax in finely granular state and the wax was further wet-pulverized by Ultra Viscomill (manufactured by AIMEX) to obtain [wax dispersion 1].

Production Example 18

Production of Resin Solution

At first, 10 parts of [polyester b1] and 10 parts of ethyl acetate were loaded into a reaction container equipped with a thermometer and a stirrer and stirred to evenly disperse these compounds to obtain [resin solution 1].

Production Example 19

Production of Resin Solution

At first, 10 parts of [polyester b2] and 10 parts of ethyl acetate were loaded into a reaction container equipped with a thermometer and a stirrer and stirred to evenly disperse these compounds to obtain [resin solution 2].

Production Example 20

Production of Resin Solution

At first, 10 parts of [vinyl resin b3] and 10 parts of ethyl acetate were loaded into a reaction container equipped with a thermometer and a stirrer and stirred to evenly disperse these compounds to obtain [resin solution 3].

Production Example 21

Production of Resin Solution

[Resin solution 4] was obtained by dissolving and mixing 200 parts of [urethane-modified polyester b4] and 800 parts of [polyester b5] in 1,800 parts of ethyl acetate. A portion of [resin solution 4] was dried in reduced pressure to isolate the resin component. Tg of the resin component measured by DSC was 55° C.

Example 1

A beaker was filled with 48 parts of [resin solution 1], 12 parts of [resin solution 2], 27 parts of [wax dispersion 1], and 10 parts of [colorant dispersion 1] and the mixture was stirred at 25° C. and 8,000 rpm by TK type homomixer to evenly dissolve and disperse the mixture and obtain [resin solution 1A]

A beaker was filled with 97 parts of ion exchanged water, 15.4 parts of [fine particle dispersion W1], 1 part of carboxymethyl cellulose sodium salt, and 10 parts of an aqueous solution of 48.5% of dodecyldiphenyl ether disulfonic acid sodium salt (Eleminol MON-7, manufactured by Sanyo Chemical Industries, Ltd.) and the mixture was evenly dissolved. Successively, while the mixture was stirred at 25° C. and 10,000 rpm by TK type homomixer, 75 parts of [resin solution 1A] was added and stirred for 2 minutes. The resulting mixed solution was transferred to a flask equipped with a stirrer and a thermometer and heated to 35° C. and ethyl acetate was removed until the concentration reached to 0.5% or lower to obtain a water-based resin dispersion (XF1) of resin particles each composed of a core layer (Q) of (B) and a shell layer (P) in a film-like form made of (A) formed on the surface of the core layer. Next, the dispersion was filtered and the particles were dried at 40° C.×18 hours to decrease the volatile component to 0.5% or less and obtain resin particles (F1).

Example 2

A water-based resin dispersion (XF2) of resin particles each composed of (Q) and (P) formed on the surface of (Q) and resin particles (F2) were obtained in the same manner as Example 1, except that [fine particle dispersion W2] 12.3 parts was used in place of [fine particle dispersion W1] 15.4 parts of Example 1.

Example 3

A beaker was filled with 48 parts of [resin solution 1], 6 parts of [prepolymer 1], 0.2 parts of [curing agent 1], 27 parts of [wax dispersion 1], and 10 parts of [colorant dispersion 1] and the mixture was stirred at 25° C. and 8,000 rpm by TK type homomixer to evenly dissolve and disperse the mixture and obtain [resin solution 1B].

A beaker was filled with 97 parts of ion exchanged water, 10.5 parts of [fine particle dispersion W1], 1 part of carboxymethyl cellulose sodium salt, and 10 parts of an aqueous solution of 48.5% of dodecyldiphenyl ether disulfonic acid sodium salt (Eleminol MON-7, manufactured by Sanyo Chemical Industries, Ltd.) and the mixture was evenly dissolved. Successively, while the mixture was stirred at 25° C. and 10,000 rpm by TK type homomixer, 75 parts of [resin solution 1B] was added and stirred for 2 minutes. The resulting mixed solution was transferred to a flask equipped with a stirrer and a thermometer and heated to 35° C. and ethyl acetate was removed until the concentration reached to 0.5% or lower to obtain a water-based resin dispersion (XF3) of resin particles each composed of a core layer (Q) of (B) and a shell layer (P) in a film-like form made of (A) formed on the surface of the core layer. Next, the dispersion was filtered and the particles were dried at 40° C.×18 hours to decrease the volatile component to 0.5% or less and obtain resin particles (F3).

Example 4

A water-based resin dispersion (XF4) of resin particles each composed of (Q) bearing (P) on the surface thereof and resin particles (F4) were obtained in the same manner as Example 3, except that [fine particle dispersion W2] was used in place of [fine particle dispersion W1] of Example 3.

Example 5

A beaker was filled with 60 parts of [resin solution 3], 27 parts of [wax dispersion 1], and 10 parts of [colorant dispersion 1] and the mixture was stirred at 25° C. and 8,000 rpm by TK type homomixer to evenly dissolve and disperse the mixture and obtain [resin solution 3A].

A beaker was filled with 97 parts of ion exchanged water, 10.5 parts of [fine particle dispersion W1], 1 part of carboxymethyl cellulose sodium salt, and 10 parts of an aqueous solution of 48.5% of dodecyldiphenyl ether disulfonic acid sodium salt (Eleminol MON-7, manufactured by Sanyo Chemical Industries, Ltd.) and the mixture was evenly dissolved. Successively, while the mixture was stirred at 25° C. and 10,000 rpm by TK type homomixer, 75 parts of [resin solution 3A] was added and stirred for 2 minutes. The resulting mixed solution was transferred to a flask equipped with a stirrer and a thermometer and heated to 35° C. and ethyl acetate was removed until the concentration reached to 0.5% or lower to obtain a water-based resin dispersion (XF5) of resin particles each composed of a core layer (Q) of (B) and a shell layer (P) in a film-like form made of (A) formed on the surface of the core layer. Next, the dispersion was filtered and the particles were dried at 40° C.×18 hours to decrease the volatile component to 0.5% or less and obtain resin particles (F5).

Example 6

A water-based resin dispersion (XF6) of resin particles each composed of (Q) bearing (P) on the surface thereof and resin particles (F6) were obtained in the same manner as Example 5, except that [fine particle dispersion W2] was used in place of [fine particle dispersion W1] of Example 5.

Example 7

A beaker was filled with 60 parts of [resin solution 1], 27 parts of [wax dispersion 1], and 10 parts of [colorant dispersion 1] and the mixture was stirred at 25° C. and 8,000 rpm by TK type homomixer to evenly dissolve and disperse the mixture and obtain [resin solution 1C].

A beaker was filled with 97 parts of ion exchanged water, 11 parts of [fine particle dispersion W4], 1 part of carboxymethyl cellulose sodium salt, and 10 parts of an aqueous solution of 48.5% of dodecyldiphenyl ether disulfonic acid sodium salt (Eleminol MON-7, manufactured by Sanyo Chemical Industries, Ltd.) and the mixture was evenly dissolved. Successively, while the mixture was stirred at 25° C. and 10,000 rpm by TK type homomixer, 75 parts of [resin solution 1C] was added and stirred for 2 minutes. The resulting mixed solution was transferred to a flask equipped with a stirrer and a thermometer and heated to 35° C. and ethyl acetate was removed until the concentration reached to 0.5% or lower to obtain a water-based resin dispersion (XF7) of resin particles each composed of a core layer (Q) of (B) and a shell layer (P) in a film-like form made of (A) formed on the surface of the core layer. Next, the dispersion was filtered and the particles were dried at 40° C.×18 hours to decrease the volatile component to 0.5% or less and obtain resin particles (F7).

Example 8

The water-based resin dispersion (XF7) obtained in Example 7 was heated to 70° C. in stirring condition and continuously stirred for 1 hour and then cooled to 25° C. to obtain a water-based resin dispersion (XF8) of resin particles each composed of a core layer (Q) of (B) and a shell layer (P) in a more film-like form made of (A) formed on the surface of the core layer. Next, same filtration and drying process was carried out to obtain resin particles (F8).

Example 9

A beaker was filled with 276 parts of [resin solution 4], as a releasing agent 10 parts of trimethylolpropane tribehenate (melting point 58° C. and melt viscosity 24 cps), and 25 parts of [colorant dispersion 2] and the mixture was stirred at 25° C. and 12,000 rpm by a TK type homomixer and evenly dissolved and dispersed to obtain [resin solution 4A].

A beaker was filled with 443 parts of ion-exchanged water, 15 parts of [fine particle dispersion W6], 2 parts of carboxymethyl cellulose sodium salt, 40 parts of an aqueous solution of 48.5% sodium dodecyl diphenyl ether disulfonate (Eleminol MON-7, manufactured by Sanyo Chemical Industries, Ltd.) and the mixture was evenly dissolved. Next, under stirring condition at 25° C. and 12,000 rpm by a TK type homomixer, 300 parts of [resin solution 4A] was added and stirred for 10 minutes. Successively, the obtained mixture was transferred to a flask equipped with a stirrer and a thermometer and heated to remove ethyl acetate and further heated to 70° C. and reacted for 5 hours to obtain a water-based resin dispersion (XF9) of resin particles each composed of a core layer (Q) of (B) and (A) adhering on the core surface. Next, the dispersion was filtered and the product was dried in condition of 40° C.×18 hours to decrease the volatile component to 0.5% or lower and obtain resin particles (F9).

Example 10

The water-based resin dispersion (XF 9) obtained in Example 9 was heated to 70° C. and stirred for 1 hour and then cooled to 25° C. to obtain a water-based resin dispersion (XF 10) of resin particles each composed of a core layer (Q) of (B) and a shell layer (P) in a film-like form made of (A) formed on the surface of the core layer. Next, filtration was carried out in the same manner to obtain resin particles (F10).

Comparative Example 1

The water-based resin dispersion (XF1) obtained in Example 1 was heated to 85° C. in stirring condition and continuously stirred for 1 hour and then cooled to 25° C. to obtain a water-based resin dispersion (XF'1) in which (P) was peeled off (Q). Next, same filtration and drying process was carried out to obtain resin particles (F'1) containing only (Q) and from which (P) was removed by the filtration.

Comparative Example 2

The water-based resin dispersion (XF2) obtained in Example 2 was heated to 85° C. in stirring condition and continuously stirred for 1 hour and then cooled to 25° C. to obtain a water-based resin dispersion (XF'2) in which (P) was peeled off (Q). Next, same filtration and drying process was carried out to obtain resin particles (F'2) containing only (Q) and from which (P) was removed by the filtration.

Comparative Example 3

The water-based resin dispersion (XF'3) of resin particles each composed of a core layer (Q) of (B) and resin particles (A) adhering to the surface of the core layer and the resin particles (F'3) were obtained in the same manner as Example 2, except that [fine particle dispersion W3] 2.9 parts was used in place of [fine particle dispersion W1] 15.4 parts in the Example 1.

Comparative Example 4

The water-based resin dispersion (XF3) obtained in Example 3 was heated to 85° C. in stirring condition and continuously stirred for 1 hour and then cooled to 25° C. to obtain a water-based resin dispersion (XF'4) in which (P) was peeled off (Q). Next, same filtration and drying process was carried out to obtain resin particles (F'4) containing only (Q) and from which (P) was removed by the filtration.

Comparative Example 5

The water-based resin dispersion (XF4) obtained in Example 4 was heated to 85° C. in stirring condition and continuously stirred for 1 hour and then cooled to 25° C. to obtain a water-based resin dispersion (XF'5) in which (P) was peeled off (Q). Next, same filtration and drying process was carried out to obtain resin particles (F'5) containing only (Q) and from which (P) was removed by the filtration.

Comparative Example 6

The water-based resin dispersion (XF5) obtained in Example 5 was heated to 85° C. in stirring condition and continuously stirred for 1 hour and then cooled to 25° C. to obtain a water-based resin dispersion (XF'6) in which (P) was peeled off (Q). Next, same filtration and drying process was carried out to obtain resin particles (F'6) containing only (Q) and from which (P) was removed by the filtration.

Comparative Example 7

The water-based resin dispersion (XF6) obtained in Example 6 was heated to 85° C. in stirring condition and continuously stirred for 1 hour and then cooled to 25° C. to obtain a water-based resin dispersion (XF'7) in which (P) was peeled off (Q). Next, same filtration and drying process was carried out to obtain resin particles (F'7) containing only (Q) and from which (P) was removed by the filtration.

Comparative Example 8

The water-based resin dispersion (XF'8) of resin particles each composed of a core layer (Q) of (B) and resin particles (A) adhering to the surface of the core layer and the resin particles (F'8) were obtained in the same manner as Example 7, except that [fine particle dispersion W5] was used in place of [fine particle dispersion W4] in the Example 7.

Comparative Example 9

After the water-based resin dispersion (XF'8) obtained in Comparative Example 8 was heated to 70° C. in stirring condition and stirred for 1 hour, the dispersion was cooled to 25° C. to obtain a water-based resin dispersion (XF'9) of resin particles each composed of a core layer (Q) of (B) and (A) in slightly film-like form on the surface of the core layer. Next, filtration and drying process was carried out in the same manner to obtain resin particles (F'9).

Comparative Example 10

The water-based resin dispersion (XF'10) of resin particles each composed of a core layer (Q) of (B) and resin particles (A) adhering to the surface of the core layer and the resin particles (F'10) were obtained in the same manner as Example 9, except that [fine particle dispersion W3] was used in place of [fine particle dispersion W6] in the Example 9.

Physical Property Measurement

The resin particles (F1) to (F10) and (F'1) to (F'10) obtained in Examples 1 to 10 and Comparative Examples 1 to 10 were dispersed in water and the particle size distribution was measured by Coulter counter. The average degree of circularity, the electrostatic property, the thermal resistance storage stability, and the low temperature fixing property of the resin particles were measured. The results are shown in Tables 1 and 2. The mark ○ shows that the defined points were found within the quadrangular area ABCD and the mark x shows that the defined points were found out of the quadrangular area ABCD with respect to the second invention.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Type of resin particles | F1 | F2 | F3 | F4 | F5 | F6 | F7 | F8 | F9 | F10 |
| Content of (A) in resin particles (%) | 8.1 | 10.8 | 8.1 | 10.8 | 8.1 | 10.8 | 6.0 | 6.0 | 2.3 | 2.3 |
| Attaching state of (A) | Film-like form | Film-like form | Film-like form | Film-like form | Film-like form | Film-like form | Film-like form | More film-like form | Granular | Film-like form |
| Glass transition temperature of (a) (° C.) | 72 | 60 | 72 | 60 | 72 | 60 | 75 | 75 | 72 | 72 |
| Initial softening temperature of (a) (° C.) | 98 | 90 | 98 | 90 | 98 | 90 | 100 | 100 | 115 | 110 |
| Flow temperature of (a) (° C.) | 175 | 155 | 175 | 155 | 175 | 155 | 160 | 160 | 205 | 198 |
| Difference of glass transition temperature and flow temperature of (a) (° C.) | 103 | 95 | 103 | 95 | 103 | 95 | 85 | 85 | 133 | 126 |
| Content of carboxyl group in (a) (%) | 9.8 | 0.2 | 9.8 | 0.2 | 9.8 | 0.2 | 9.8 | 9.8 | 9.8 | 9.8 |
| Neutralization ratio of carboxyl group in (a) (%) | 0 | 100 | 0 | 100 | 0 | 100 | 0 | 0 | 0 | 0 |
| Δsp of resin (a) and resin (b) | 0.4 | 0.3 | 0.8 | 0.7 | 0.6 | 0.5 | 0.5 | 0.5 | 1.1 | 1.1 |
| Weight average molecular weight of (a) (×1000) | 6 | 4 | 6 | 4 | 6 | 4 | 6.2 | 6.2 | 270 | 270 |
| In the inside of quadrangular area ABCD | ○ | ○ | ○ | ○ | ○ | ○ | ○ | ○ | X | X |
| Volume average particle diameter of (A) (μm) | 0.09 | 0.05 | 0.09 | 0.05 | 0.09 | 0.05 | 0.10 | 0.10 | 0.08 | 0.08 |
| Volume average particle diameter of (C) (μm) | 5.6 | 5.5 | 5.7 | 5.5 | 5.3 | 5.7 | 5.6 | 5.6 | 5.2 | 5.2 |
| Surface coverage (%) | 100 | 100 | 100 | 100 | 100 | 100 | 100 | 100 | 90 | 100 |
| Volume average particle diameter/number average particle diameter of (C) | 1.17 | 1.18 | 1.17 | 1.17 | 1.14 | 1.16 | 1.18 | 1.18 | 1.12 | 1.12 |
| Average degree of circularity of (C) | 0.98 | 0.98 | 0.98 | 0.98 | 0.98 | 0.98 | 0.98 | 0.98 | 0.98 | 0.98 |
| Smoothness of particle surface of (C) | ○ | ○ | ○ | ○ | ○ | ○ | ○ | ◎ | X | ○ |
| Electrostatic charge (μC/g) | −17 | −26 | −18 | −22 | −20 | −21 | −17 | −17 | −30 | −30 |
| Low temperature fixing property (° C.) | 105 | 105 | 105 | 105 | 125 | 125 | 105 | 105 | 125 | 125 |
| Thermal resistant storage stability | ○ | ○ | ○ | ○ | ○ | ○ | ○ | ○ | ○ | ○ |

TABLE 2

| | Comparative Example | | | | | | | | | |
|---|---|---|---|---|---|---|---|---|---|---|
| | 1 | 2 | 3 | 4 | 5 | 6 | 7 | 8 | 9 | 10 |
| Type of resin particles | F' 1 | F' 2 | F' 3 | F' 4 | F' 5 | F' 6 | F' 7 | F' 8 | F' 9 | F' 10 |
| Content of (A) in resin particles (%) | 0 | 0 | 2.3 | 0 | 0 | 0 | 0 | 6.0 | 6.0 | 2.1 |
| Attaching state of (A) | No adhesion | No adhesion | Granular | No adhesion | No adhesion | No adhesion | No adhesion | Granular | Slightly film-like form | Granular |
| Glass transition temperature of (a) (° C.) | 72 | 60 | 60 | 72 | 60 | 72 | 60 | 95 | 95 | 60 |
| Initial softening temperature of (a) (° C.) | 98 | 90 | 110 | 98 | 90 | 98 | 90 | 120 | 120 | 110 |
| Flow temperature of (a) (° C.) | 175 | 155 | 198 | 175 | 155 | 175 | 155 | 225 | 225 | 198 |
| Difference of glass transition temperature and flow temperature of (a) (° C.) | 103 | 95 | 138 | 103 | 95 | 103 | 95 | 130 | 130 | 138 |
| Content of carboxyl group in (a) (%) | 9.8 | 0.2 | 9.8 | 9.8 | 6.0 | 9.8 | 0.2 | 9.8 | 9.8 | 9.8 |
| Neutralization ratio of carboxyl group in (a) (%) | 0 | 100 | 0 | 0 | 100 | 0 | 100 | 0 | 0 | 0 |
| Δsp of resin (a) and resin (b) | 0.4 | 0.3 | 0.7 | 0.8 | 0.7 | 0.6 | 0.5 | 0.5 | 0.5 | 1.1 |
| Weight average molecular weight of (a) (×1000) | 6 | 4 | 270 | 6 | 4 | 6 | 4 | 320 | 320 | 270 |
| In the inside of quadrangular area ABCD | ◯ | ◯ | X | ◯ | ◯ | ◯ | ◯ | X | X | X |
| Volume average particle diameter of (A) (μm) | 0.09 | 0.05 | 0.05 | 0.09 | 0.05 | 0.09 | 0.05 | 0.10 | 0.10 | 0.05 |
| Volume average particle diameter of (C) (μm) | 5.4 | 5.2 | 5.6 | 5.6 | 5.4 | 5.2 | 5.6 | 5.6 | 5.6 | 5.3 |
| Surface coverage (%) | 0 | 0 | 90 | 0 | 0 | 0 | 0 | 100 | 100 | 80 |
| Volume average particle diameter/number average particle diameter of (C) | 1.17 | 1.18 | 1.15 | 1.17 | 1.17 | 1.14 | 1.16 | 1.21 | 1.21 | 1.13 |
| Average degree of circularity of (C) | 0.98 | 0.98 | 0.98 | 0.98 | 0.98 | 0.98 | 0.98 | 0.97 | 0.97 | 0.96 |
| Smoothness of particle surface of (C) | X | X | X | X | X | X | X | X | Δ | X |
| Electrostatic charge (μC/g) | 2 | −2 | −8 | −2 | −3 | −2 | −3 | −17 | −17 | −12 |
| Low temperature fixing property (° C.) | 105 | 105 | 135 | 105 | 105 | 125 | 125 | 140 | 140 | 125 |
| Thermal resistant storage stability | X | X | ◯ | X | X | X | X | ◯ | ◯ | ◯ |

The measurement of the average degree of circularity was carried out according to the above-mentioned manner.

The measurement methods for the electrostatic property, thermal resistant storage stability, low temperature fixing property, and surface smoothness are as follows.

[Electrostatic Property] (Electrostatic Charge)

Resin particle 0.5 g and iron powder (F-150, manufactured by Nippon Iron Powder Corporation Ltd.) 10 g were precisely weighed and put in a 50 cc ground stopper glass bottle and plugged and set in a tumbler shaker mixer (manufactured by Willy Bachofen) at 23° C. and 50% RH and rotated at 90 rpm for 2 minutes. After the stirring, 0.2 g of the mixed powder was packed in a blow-off powder charge quantity measurement apparatus (TB-203, manufactured by KYOCERA CORP) in which a stainless net with 20 μm meshes was installed and the charge quantity of the remaining iron powder in blow pressure 10 KPa and suction pressure 5 KPa and the charge quantity of the resin particles was calculated according to the standardized method. As the minus charge quantity is higher, the electrostatic property is more excellent for a toner.

[Thermal Resistant Storage Stability]

The resin particles were kept still for 15 hours in a dryer controlled to be at 50° C. and evaluation was carried out in accordance with the blocking extent based on the following standard.

◯: no blocking occurred;

Δ: although blocking occurred, particles were easily dispersed by applying power; and x: blocking occurred and even if power was applied, particles were not dispersed.

[Low Temperature Fixing Property]

Aerosil R972 (manufactured by Nippon Aerosil) in an amount of 1.0% was added to the resin particles and well and evenly mixed and the obtained powder was spread on paper in a weight density of 0.6 mg/cm$^2$ (in this case a printer from which a heat fixing unit was disassembled was used for the method for spreading the powder on the paper (if it is possible to evenly spread the powder with the above-mentioned weight density, any other method may be employed.)). The paper was passed through a pressure roller in conditions of a fixing speed (heating roller peripheral speed) of 213 mm/sec and a fixing pressure (pressure roller pressure) 10 kg/cm² and the temperature of occurrence of cold off-set was measured.

[Surface Smoothness]

The surfaces of the resin particles (C) were photographed at 10,000 and 30,000 magnification by a scanning electron microscope (SEM) and evaluated accordingly.

⊚: no unevenness in the surface and very smooth:

○: although uneven portion is observed in the surface; comprehensively unevenness is scarce and the surface is smooth:

Δ: although the entire surface is uneven, no granular substance derived from the resin (a) is observed: and x: the entire surface is very rough, or granules derived from the resin (a) are observed.

INDUSTRIAL APPLICABILITY

Since resin dispersions and resin particles of the inventions have even particle diameters and excellent in electrostatic property and thermal resistant storage stability, they are very useful for resin particles to be used for resins for slush molding, powder coating, spacers for electronic parts such as liquid crystals, standard particles for electronic measurement instruments, toners for electrophotograph, electrostatic recording, and electrostatic printing, various kinds of hot melt adhesives, and other molding materials.

The invention claimed is:

1. Core-shell type resin particles (C2) each comprising a film shell layer (P) in one or more layer structure made of a first resin (a) and a core layer (Q) in one layer structure made of a second resin (b), wherein the weight ratio of the film shell layer (P) and the core layer (Q) is in a range of (0.1:99.9) to (70:30), the content of volatile components of the resin particles (C2) is 2% by weight or lower, and the resin (a) has an initial softening temperature of 40 to 270° C., a glass transition temperature of 20 to 100° C., a flow temperature 60 to 220° C., and the difference of the glass transition temperature and the flow temperature in a range of 0 to 120° C.

2. The resin particles according to claim 1, wherein the resin (a) is at least one resin selected from polyester resins, epoxy resins, and vinyl resins.

3. The resin particles according to claim 1, wherein the resin (b) is at least one resin selected from polyester resins, polyurethane resins, epoxy resins, and vinyl resins.

4. The resin particles according to claim 1, wherein the resin particles (C2) are obtained by a process comprising the steps of:

dispersing the resin (b) or its solvent solution, alternatively a precursor (b0) of the resin (b) or its solvent solution, further causing a reaction of the precursor (b0) in the case of using the precursor (b0) or its solvent solution, in a water-based dispersion of resin particles (A) comprising the resin (a);

obtaining a water-based dispersion (X1) of the resin particles (C1) each comprising resin particles (B) bearing the resin particles (A) by forming the resin particles (B) comprising the resin (b) in the water-based dispersion of the resin particles (A);

obtaining a water-based dispersion (X2) of resin particles (C21) formed by forming a shell layer (P) in the form of a film made of the resin particles (A) by making the resin particles (A) into a film on the surface of a core layer (Q) containing the resin particles (B) in the water-based dispersion (X1); and finally removing the water-based solvent from the water-based dispersion (X2).

5. The resin particles according to claim 4, wherein, in the step of obtaining a water-based dispersion (X2) of resin particles (C21) formed by forming a shell layer (P) in the form of a film made of the resin particles (A) by making the resin particles (A) into a film on the surface of a core layer (Q) containing the resin particles (B) in the water-based dispersion (X1), the shell layer (P) is formed in the form of a film made of the resin particles (A) on the surface of the core layer (Q) containing the resin particles (B) by dissolving in the solvent the resin particles (A) adhering to (B) and/or melting the resin particles (A) adhering to (B) in the water-based dispersion (X1).

6. A resin for slush molding, powder coating, spacers for electronic part production, standard particles for electronic measurement instruments, electrophotograph toners, electrostatic recording toners, electrostatic printing toners or hot melt adhesives, the resin comprising the resin particles according to claim 1.

* * * * *